United States Patent
Hagio et al.

(10) Patent No.: US 10,936,873 B2
(45) Date of Patent: Mar. 2, 2021

(54) INFORMATION PROCESSING APPARATUS AND METHOD FOR GENERATING VIDEO PICTURE DATA

(71) Applicant: Panasonic i-PRO Sensing Solutions Co., Ltd., Fukuoka (JP)

(72) Inventors: Minoru Hagio, Fukuoka (JP); Keiichi Miyazaki, Fukuoka (JP); Takae Oguchi, Fukuoka (JP)

(73) Assignee: Panasonic I-PRO Sensing Solutions Co., Ltd., Fukuoka (JP)

( * ) Notice: Subject to any disclaimer, the term of this patent is extended or adjusted under 35 U.S.C. 154(b) by 164 days.

(21) Appl. No.: 16/250,653

(22) Filed: Jan. 17, 2019

(65) Prior Publication Data
US 2019/0392214 A1    Dec. 26, 2019

(30) Foreign Application Priority Data

Jun. 25, 2018   (JP) .............................. JP2018-119668

(51) Int. Cl.
*G06K 9/00* (2006.01)
*G06T 1/00* (2006.01)
*G10L 15/26* (2006.01)

(52) U.S. Cl.
CPC ..... *G06K 9/00671* (2013.01); *G06K 9/00718* (2013.01); *G06K 9/00744* (2013.01); *G06T 1/0007* (2013.01); *G10L 15/26* (2013.01); *G06K 2009/00738* (2013.01)

(58) Field of Classification Search
CPC .......... G06K 9/0071; G06K 9/18; G06K 9/38; G06K 9/51; G06K 2009/00738
See application file for complete search history.

(56) References Cited

U.S. PATENT DOCUMENTS

| 5,664,006 | A | 9/1997 | Monte et al. |
| 2008/0062248 | A1 | 3/2008 | Sahashi |
| 2009/0290847 | A1* | 11/2009 | Sathav .................... H04N 7/18 386/278 |

(Continued)

FOREIGN PATENT DOCUMENTS

JP   2009-86207 A   4/2009

OTHER PUBLICATIONS

First Action Interview Pilot Program Pre-Interview Communication dated Jun. 15, 2020 for the corresponding U.S. Appl. No. 16/250,661, 4 pages.

(Continued)

*Primary Examiner* — Wen W Huang
(74) *Attorney, Agent, or Firm* — Seed IP Law Group LLP

(57) ABSTRACT

An information processing apparatus includes an obtainer that obtains video picture data designated by a terminal apparatus from a storage apparatus storing video picture data of a video picture shot by a wearable camera attached to or owned by a police officer or by an on-vehicle camera mounted on a police vehicle, a generator that analyzes a video picture in the obtained video picture data to generate information associated with a case and generates summary video picture data that is a video picture portion as a report target of the case extracted from the video picture data based on the generated information, and a transmitter that transmits the summary video picture data to the terminal apparatus.

13 Claims, 24 Drawing Sheets

(56) References Cited

U.S. PATENT DOCUMENTS

| | | |
|---|---|---|
| 2011/0287787 A1 | 11/2011 | Nagaraja et al. |
| 2015/0264296 A1* | 9/2015 | Devaux ............... H04N 9/8205 386/226 |
| 2016/0132731 A1* | 5/2016 | Hisada ............... G06K 9/00771 382/103 |
| 2016/0191862 A1* | 6/2016 | Yokomitsu ............ H04N 5/232 348/158 |
| 2016/0307600 A1* | 10/2016 | Koide ................. G06K 9/2081 |
| 2016/0366327 A1 | 12/2016 | Kusens |
| 2017/0262707 A1* | 9/2017 | Zhao ................. G06K 9/00751 |
| 2018/0255277 A1 | 9/2018 | Kessel |
| 2019/0286901 A1* | 9/2019 | Blanco .............. G06K 9/00536 |
| 2019/0378429 A1 | 12/2019 | Panuganty et al. |

OTHER PUBLICATIONS

Office Action Summary dated Dec. 10, 2020, for the corresponding U.S. Appl. No. 16/250,661, 11 pages.

\* cited by examiner

METADATA
·PATLITE ON
·SUDDEN STARTING DETECTION
·COLLISION DETECTION
·BACKDOOR OPENING
·TAKEOUT OF GUN
·SPEED EXCESS DETECTION
·MANUAL RECORD ON/OFF
·DASH DETECTION
·FALLING DETECTION
·FIGHT DETECTION
·EXCITING STATE DETECTION
·GPS INFORMATION

FIG. 9A

RETRIEVAL INPUT — 51a

- CASE NUMBER: NJ180425000011003
- DATE:
- CASE TYPE:
- POLICE OFFICER NAME:
- POLICE STATION NAME:

[RETRIEVAL]

FIG. 9B

RETRIEVAL RESULT DISPLAY — 51b [RETURN]

CASE NUMBER: NJ180425000011003

| | SELECTION |
|---|---|
| ICV VIDEO | ○ |
| BWC VIDEO | ○ |
| HANDWRITTEN MEMORANDUM | ○ |
| SITE PHOTOGRAPH | ○ |

[BROWSE] [CONVERSION INTO TEXT FROM VOICE] [EXPORT]

FIG. 9C

RETRIEVAL RESULT DISPLAY — 51c [RETURN]

CASE NUMBER: NJ180425000011003

| | SELECTION |
|---|---|
| ICV VIDEO | ○ |
| BWC VIDEO | ● |
| HANDWRITTEN MEMORANDUM | ○ |
| SITE PHOTOGRAPH | ○ |

[BROWSE] [CONVERSION INTO TEXT FROM VOICE] [EXPORT]

DISPLAY OF DATA CONVERTED INTO TEXT FROM VOICE [RETURN]

CASE NUMBER     NJ180425000011003

2018/4/10  12:50:30
Speaker A : Freeze
METADATA                    IMAGE OF TIME STAMP 2018/4/10  12:50:32
Speaker B : No
METADATA                    IMAGE OF TIME STAMP

[REPORT PRODUCTION]   [EXPORT]

REPORT OUTPUT OF DATA CONVERTED INTO TEXT FROM VOICE [RETURN]

CASE NUMBER     NJ180425000011003

OUTPUT FORMAT SELECTION     * .txt ▼

OUTPUT TARGET SELECTION                    SELECTION
    METADATA                                ☑
    STILL IMAGE                             ☐
    TIME STAMP LINK                         ☐

[START]

FIG. 11D

INTELLI-METADATA
- PERSON DETECTION/NON-DETECTION
- VEHICLE DETECTION/NON-DETECTION
- ABNORMAL BEHAVIOR DETECTION/NON-DETECTION
- CROWD OF PEOPLE DETECTION/NON-DETECTION
- CONVERSATION DETECTION/NON-DETECTION
- GUNSHOT DETECTION/NON-DETECTION
- EXPLOSION SOUND DETECTION/NON-DETECTION
FIG. 16
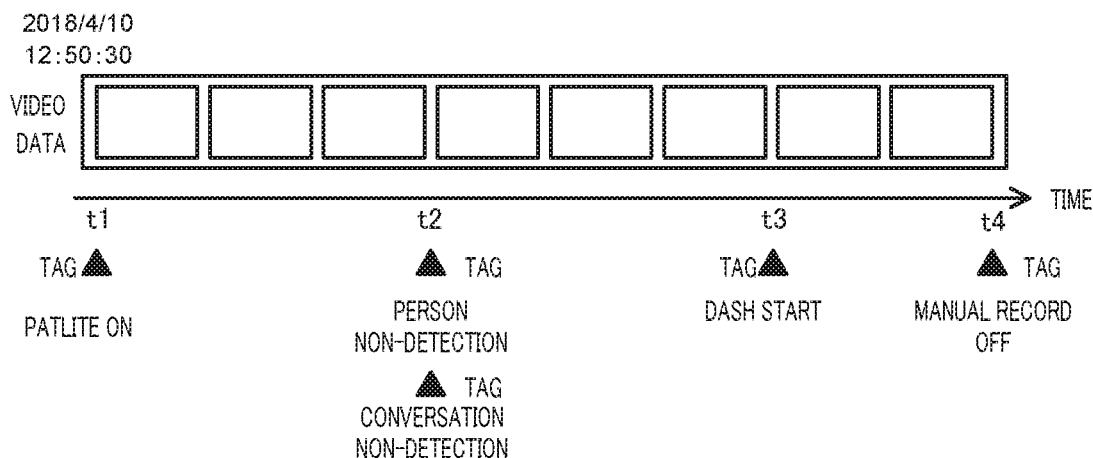
FIG. 17
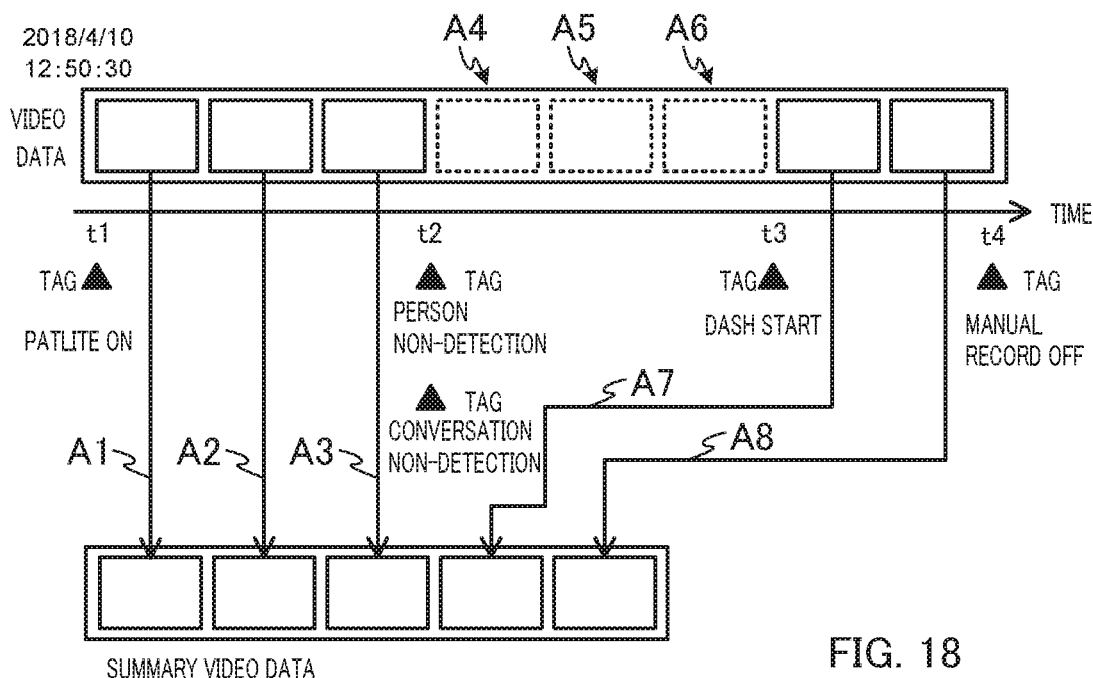
FIG. 18

91a

RETRIEVAL INPUT

| | |
|---|---|
| CASE NUMBER | NJ180425000011003 |
| DATE | |
| CASE TYPE | |
| POLICE OFFICER NAME | |
| POLICE STATION NAME | |

[RETRIEVAL]

RETRIEVAL RESULT DISPLAY [RETURN]

CASE NUMBER   NJ180425000011003

| | SELECTION |
|---|---|
| ICV VIDEO | ○ |
| BWC VIDEO | ○ |
| HANDWRITTEN MEMORANDUM | ○ |
| SITE PHOTOGRAPH | ○ |

[BROWSE] [CONVERSION INTO TEXT FROM VOICE] [VIDEO SUMMARY] [EXPORT]

RETRIEVAL RESULT DISPLAY　　　　　　　　　　[RETURN]
　　CASE NUMBER　NJ180425000011003

|  | SELECTION |
|---|---|
| ICV VIDEO | ○ |
| BWC VIDEO | ● |
| HANDWRITTEN MEMORANDUM | ○ |
| SITE PHOTOGRAPH | ○ |

[BROWSE]　[CONVERSION INTO TEXT FROM VOICE]　[VIDEO SUMMARY]　[EXPORT]

VIDEO SUMMARY SETTING　　　　　　　　　　[RETURN]
　　CASE NUMBER　NJ180425000011003

VIDEO DISPLAY INFORMATION

|  | SELECTION |
|---|---|
| METADATA | ☑ |
| INTELLI-METADATA | ☐ |

[START]

92a
RETRIEVAL INPUT
- CASE NUMBER: NJ180425000011003
- DATE:
- CASE TYPE:
- POLICE OFFICER NAME:
- POLICE STATION NAME:

[RETRIEVAL]

FIG. 23B

92b
RETRIEVAL RESULT DISPLAY [RETURN]
CASE NUMBER  NJ180425000011003

| | SELECTION |
|---|---|
| ICV VIDEO | ○ |
| BWC VIDEO | ○ |
| HANDWRITTEN MEMORANDUM | ○ |
| SITE PHOTOGRAPH | ○ |
| SUMMARY VIDEO | ○ |

[BROWSE] [CONVERSION INTO TEXT FROM VOICE] [VIDEO SUMMARY] [EXPORT]

INFORMATION PROCESSING APPARATUS AND METHOD FOR GENERATING VIDEO PICTURE DATA

CROSS REFERENCE TO RELATED APPLICATIONS

This application is entitled and claims the benefit of Japanese Patent Application No. 2018-119668, filed on Jun. 25, 2018, the disclosure of which including the specification, drawings and abstract is incorporated herein by reference in its entirety.

TECHNICAL FIELD

The present disclosure relates to an information processing apparatus and a method for generating video picture data.

BACKGROUND ART

Recently, in order to efficiently support work of a police officer, studies on an operation such as causing a police officer at patrol to wear or own a wearable camera to record an imaged video picture have been in progress. In addition, operations such as mounting an on-vehicle camera on a police vehicle to record an imaged video picture have been in progress.

Conventionally, there has been proposed a minute information generation system for generating minute information by using a voice recognizing means for text-converting voice information into text information (for example, refer to PTL 1).

CITATION LIST

Patent Literature

PTL 1
Japanese Patent Application Laid-Open No. 2009-86207

SUMMARY OF INVENTION

Technical Problem

For example, a police officer may view a video picture of a case shot by a camera to generate a document of a report or the like. The video picture shot by the camera includes a video picture irrelevant to a content of the report or the like and when a document is generated by viewing such a video picture, the production work is time consuming.

One non-limiting and exemplary embodiment facilitates providing an information processing apparatus and a method for generating video picture data to facilitate production of a document associated with a case at the police.

Solution to Problem

An information processing apparatus according to an aspect of the present disclosure includes: an obtainer that obtains video picture data designated by a terminal apparatus from a storage apparatus storing video picture data of a video picture shot by a wearable camera attached to or owned by a police officer or by an on-vehicle camera mounted on a police vehicle; a generator that analyzes a video picture in the obtained video picture data to generate information associated with a case and generates summary video picture data that is a video picture portion as a report target of the case extracted from the video picture data based on the generated information; and a transmitter that transmits the summary video picture data to the terminal apparatus.

A method for generating video picture data, according to an aspect of the present disclosure, includes: obtaining video picture data designated by a terminal apparatus from a storage apparatus storing video picture data of a video picture shot by a wearable camera attached to or owned by a police officer or by an on-vehicle camera mounted on a police vehicle; analyzing a video picture in the obtained video picture data to generate information associated with a case: generating summary video picture data that is a video picture portion as a report target of the case extracted from the video picture data based on the information; and transmitting the summary video picture data to the terminal apparatus.

These comprehensive and specific aspects may be realized by a system, a method, an integrated circuit, a computer program, or a record medium, and may be realized by an optional combination of a system, an apparatus, a method, an integrated circuit, a computer program and a record medium.

Advantageous Effects of Invention

According to an aspect of the present disclosure, the production of the document associated with the case at the police is facilitated.

Further advantages and effects in an aspect of the present disclosure will be apparent from the specification and the accompanying drawings. Such advantages and/or effects will be respectively provided by some embodiments and the features described in the specification and the accompanying drawings, but all of them are not necessarily provided to obtain one or more of the same features.

BRIEF DESCRIPTION OF DRAWINGS

FIG. 9A is a diagram showing a screen example of the terminal apparatus in a generation operation of the AT file;
FIG. 9B is a diagram showing a screen example of the terminal apparatus in the generation operation of the AT file;
FIG. 9C is a diagram showing a screen example of the terminal apparatus in the generation operation of the AT file.

FIG. 11A is a diagram showing a screen example of the terminal apparatus in a report generation operation;

FIG. 11B is a diagram showing a screen example of the terminal apparatus in the report generation operation;

FIG. 11C is a diagram showing a screen example of the terminal apparatus in the report generation operation;

FIG. 11D is a diagram showing a screen example of the terminal apparatus in the report generation operation;

FIG. 16 is a diagram explaining an example of intelligent metadata;

FIG. 17 is diagram explaining a generation example of an intelligent metafile;

FIG. 18 is a diagram explaining a generation example of a summary video file;

FIG. 21A is a diagram showing a screen example of the terminal apparatus in a generation operation of the summary video file;

FIG. 21B is a diagram showing a screen example of the terminal apparatus in the generation operation of the summary video file;

FIG. 21C is a diagram showing a screen example of the terminal apparatus in the generation operation of the summary video file;

FIG. 21D is a diagram showing a screen example of the terminal apparatus in the generation operation of the summary video file;

FIG. 23A is a diagram showing a screen example of the terminal apparatus in a browsing operation of the summary video file;

FIG. 23B is a diagram showing a screen example of the terminal apparatus in the browsing operation of the summary video file;

DESCRIPTION OF EMBODIMENTS

Hereinafter, an explanation will be in detail made of embodiments in the present invention with reference to the accompanying drawings as needed. However, explanations detailed more than necessary may be omitted. For example, in some cases a detailed explanation of the well-known items or an overlapping explanation of the substantially identical components will be omitted. This is because it is avoided to unnecessarily make the following explanation wordy and understanding of those skilled in the art is facilitated.

The accompanying drawings and the following explanation are provided for those skilled in the art to fully understand the present disclosure and have no intent of limiting the subject defined in the claims.

Embodiment 1

Figures 1, 2:
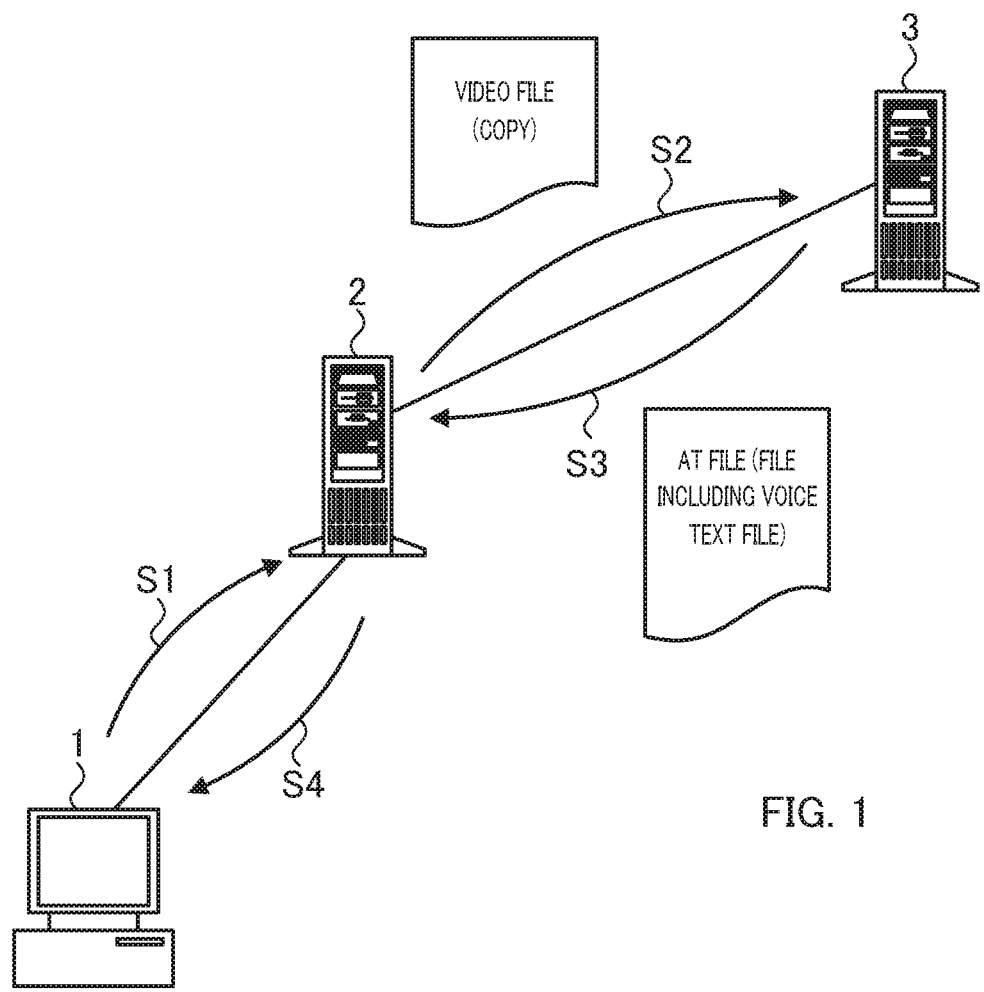
FIG. 1 is a diagram showing an example of a document production system according to Embodiment 1.
FIG. 2 is a diagram explaining an example of metadata.

FIG. 1 is a diagram showing an example of a document production system according to Embodiment 1. As shown in FIG. 1, the document production system has terminal apparatus 1 and servers 2, 3. Terminal apparatus 1, server 2, and server 3 can communicate with each other through a network, for example, a Local Area Network (LAN) or the Internet.

Functions of servers 2, 3 may be realized by a single server. The functions of servers 2, 3 may be realized by three or more servers. Servers 2, 3 may be assumed as a single information processing apparatus. That is, the information processing apparatus may be assumed to be configured of servers 2, 3. The information processing apparatus may be configured of one or more servers.

Terminal apparatus 1 is a terminal apparatus, for example, a personal computer. Terminal apparatus 1 is disposed at a police station, for example. Terminal apparatus 1 is used, for example, for document production of a report of a case or for viewing a case video.

Information on cases is stored in server 2. For example, video files (video data) of case videos shot by a wearable camera attached to or owned by a police officer are stored in server 2. In addition, video files of case videos shot by an on-vehicle camera mounted on a police vehicle are stored in server 2.

Hereinafter, when the wearable camera and the on-vehicle camera are not particularly distinguished, each of them may be called just a camera in some cases. The camera may transmit the video data to server 2 in the middle of shooting, for example. In addition, the camera may transmit the video file to server 2 after shooting finish, for example. Consequently the video file of the case video shot by the camera is stored in server 2.

Server 3 converts voices into texts. The video file is transmitted to server 3 from server 2. Server 3 converts voice data included in the video file transmitted from server 2 into text data. Server 3 transmits a file converted into text from voice (hereinafter, may be called "AT file") including the converted text data to server 2. The AT file is a binary file, for example.

Server 2 classifies cases by folders for management, for example. The video file and the AT file are classified for each case and are stored in a folder corresponding thereto. Server 2 may be called a server for managing contents on cases.

The video file stored in server 2 may be used, for example, as an evidence or the like of a case, and cannot be deleted or edited. However, the copied video file may be edited. Servers 2, 3 may be arranged, for example, at the police station or at another place.

An explanation will be made of a schematic operation example of the document production system in FIG. 1. For example, a user as a police officer uses terminal apparatus 1 to select (retrieve) a case for producing a report of the case. Herein it is assumed that the user selects case A as a case for producing a report. Terminal apparatus 1 transmits information of case A selected by the user to server 2 (step S1).

When server 2 receives the information of case A transmitted from terminal apparatus 1, server 2 obtains a video file from a folder corresponding to case A. Server 2 transmits a copy of the obtained video file to server 3 (step S2). As described later, metadata (for example, refer to FIG. 2 or FIG. 3) is included in the video file. The metadata is added by a camera.

Server 3 extracts voice data included in the video file transmitted from server 2 and converts the voice data into text data. Server 3 generates an AT file (for example, refer to FIG. 4) including the converted text data. As described later, the AT file includes, for example, date and time (time stamp) when voices in the video file were uttered and still images at that date and time. In other words, the AT file includes an utterance time of a person appearing in the video picture of the video file, a still image at that time, and a text of voices uttered by the person.

Server 3 transmits the generated AT file to server 2 (step S3).

Server 2 stores the AT file of case A transmitted from server 3 in the folder of case A. Consequently the video file of case A and the AT file of case A are stored (reserved) in the folder of case A.

Server 2 displays, for example, the AT file of case A stored in the folder on terminal apparatus 1 in response to access from terminal apparatus 1 (step A4). Consequently the user can view the AT file using terminal apparatus 1. That is, the user can view the voice included in the video picture of the video file as the text.

As described later, the user can use terminal apparatus 1 to convert the AT file into a file (hereinafter, may be called "general-purpose file") that can be browsed with a general-purpose application such as WORD (registered trademark) or EXCEL (registered trademark). For example, the user may use, for example, the converted general-purpose file as a report of case A or may edit the converted general-purpose file to be used as a report of case A.

In this way, the document production system extracts the voice data from the video file of the case for producing the report and converts the extracted voice data into text data. Then the document production system generates an AT file including the converted text data. Consequently the user can facilitate production of the document associated with the case in the police.

It should be noted that the AT file of case A is stored in the folder of case A. Accordingly the user can access the AT file of case A at any time.

FIG. 2 is a diagram explaining an example of the metadata. The metadata includes, for example, data shown in FIG. 2. The metadata is added to the video data by a camera.

"Patlite (registered trademark) ON" of the metadata is added to the video data when Patlite of a police vehicle is turned on. For example, when the Patlite is turned on by a user, the police vehicle notifies a camera of the event that Patlite is turned on. The camera adds metadata of "Patlite ON" to the video data in response to notification of "Patlite ON" by the police vehicle.

"Sudden starting detection" of the metadata is added to the video data when the police vehicle is suddenly-started. For example, when the police vehicle is suddenly-started by the user, the police vehicle notifies the camera of having been suddenly-started. The camera adds the metadata of "sudden starting detection" to the video data in response to the notification of the sudden start of the police vehicle.

"Collision detection" of the metadata is added to the video data when the police vehicle is hit by something (or collides with something). For example, when the police vehicle is hit by something, the police vehicle notifies the camera of having been hit by something. The camera adds the metadata of "collision detection" to the video data in response to notification of the collision of the police vehicle.

"Back door opening" of the metadata is added to the video data when a back door of the police vehicle is opened. For example, when the back door is opened, the police vehicle notifies the camera of the back door having been opened. The camera adds the metadata of "back door opening" to the video data in response to the notification of the back door opening of the police vehicle.

"Takeout of gun" of the metadata is added to the video data when a gun is taken out of a gun folder. For example, the gun folder is provided with a sensor for detecting the takeout of a gun, and when a gun is taken out of the gun folder, notifies the camera of the gun being taken out of the gun folder. The camera adds the metadata of "takeout of gun" to the video data in response to the notification of takeout of the gun by the sensor.

"speed excess detection" of the metadata is added to the video data when the police vehicle exceeds a speed limit. For example, the police vehicle is provided with a speed sensor, and when the police vehicle exceeds a speed limit, notifies the camera of the speed excess. The camera adds the metadata of "speed excess detection" to the video data in response to the notification of the speed excess of the police vehicle.

"Manual record on/off" of the metadata is added to the video data when a camera is turned on/off by a user.

"Dash detection" of the metadata is added to the video data when a wearable camera attached to a user detects sudden start running of the user. The wearable camera is provided with, for example, an acceleration sensor or an angular velocity sensor, making it possible to detect the sudden start running of the user.

"Falling detection" of the metadata is added to the video data when a wearable camera attached to a user detects falling of the user. The wearable camera is provided with, for example, an acceleration sensor or an angular velocity sensor, making it possible to detect the falling of the user.

"Fight detection" of the metadata is added to the video data when a camera detects a fight of a user. The user wears, for example, a biological sensor wireless communicating with the camera. The biological sensor obtains, for example, at least one of a heart rate, sweating, and a body temperature of a user as biological information. The biological sensor transmits the obtained biological information of the user to the camera by wireless communication. The camera detects the fight of the user from the biological information of the user received from the biological sensor. For example, the camera detects the fight of the user from a rise in the heart rate, the sweating, and the body temperature of the biological information of the user received from the biological sensor.

"Exciting state detection" of the metadata is added to the video data when a camera detects an exciting state of a user. The user wears the aforementioned biological sensor. The camera can detect the exciting state of the user from the biological information of the user transmitted from the biological sensor.

"GPS (global positioning system) information)" of the metadata is added to the video data when a camera detects voices. The GPS information shows a position of a user. The camera is provided with a GPS apparatus mounted thereon.

The metadata as shown in FIG. 2 can be said as information on an event having occurred associated with a case. For example, Patlite is turned on when the case occurs. Accordingly "Patlite ON" of the metadata can be said as the event having occurred associated with the case. When a criminal suddenly escapes, a user starts to run for chasing down the criminal. Accordingly "dash detection" of the metadata can be said as the event having occurred associated with the case.

It should be noted that the metadata is not limited to the example in FIG. 2. The metadata may include other information on an event having occurred associated with a case.

Figure 3:
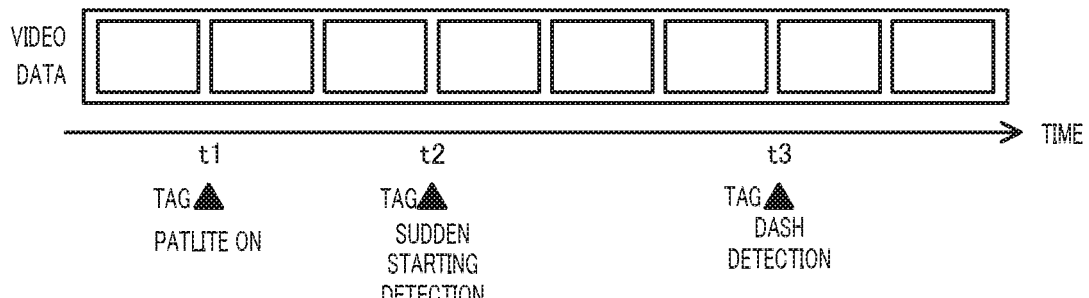
FIG. 3 is a diagram explaining an example of a concept of video data to which the metadata is added.

FIG. 3 is a diagram explaining an example of a concept of the video data to which the metadata is added. FIG. 3 shows a partial frame of the video picture shot by the wearable camera. A horizontal axis in FIG. 3 shows time.

In time t1, the wearable camera is assumed to detect the Patlite ON of a police vehicle. In this case, the metadata (tag) of the Patlite ON is added to the video data at time t1.

In time t2, the wearable camera is assumed to detect sudden start running of a police vehicle. In this case, the metadata of the sudden start running detection is added to the video data at time t2.

In time t3, the wearable camera is assumed to detect dash of a user. In this case, the metadata of the dash detection is added to the video data at time t3.

Figure 4:
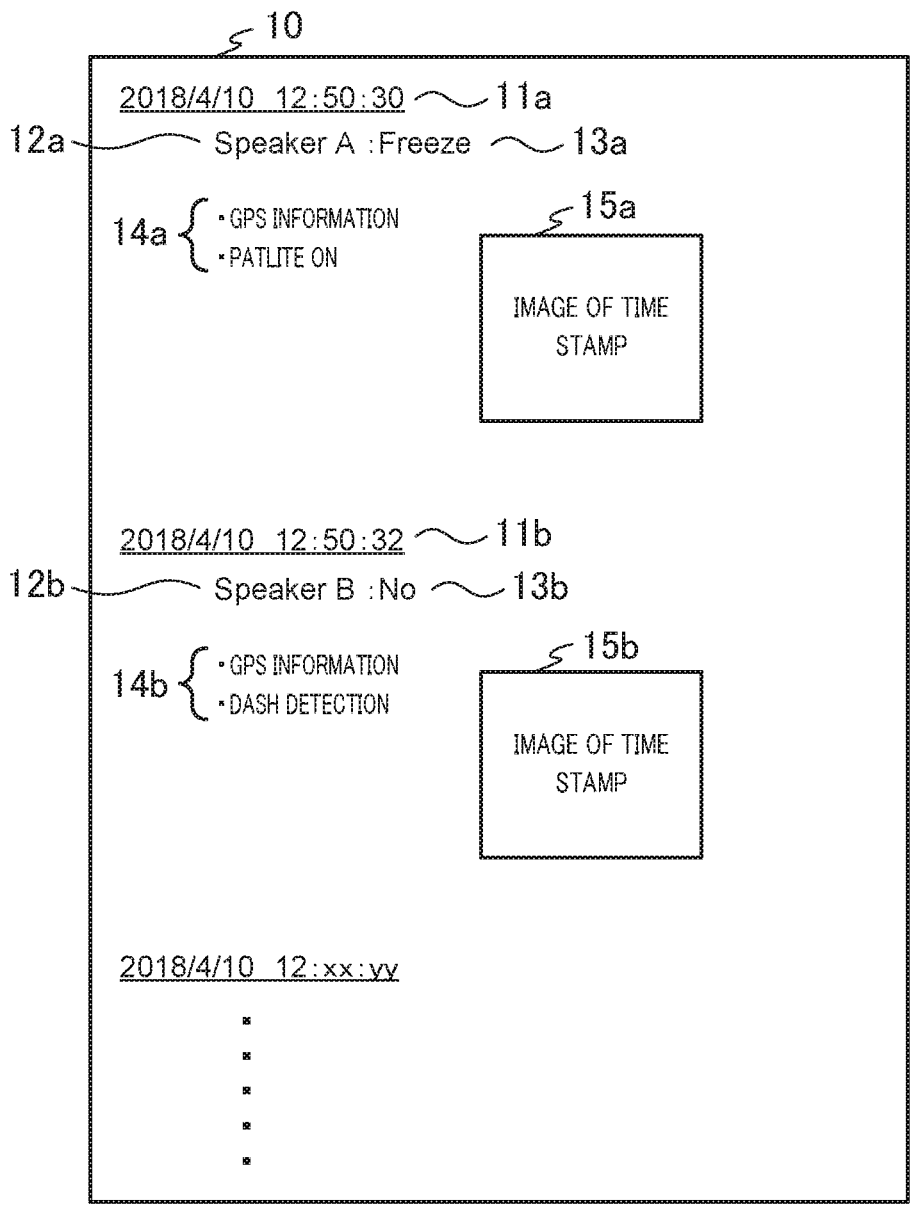
FIG. 4 is a diagram showing an example of an AT file generated by a server.

FIG. 4 is a diagram showing an example of an AT file generated by server 3. As shown in FIG. 4, AT file 10 includes time stamps 11a, 11b, identifiers 12a, 12b, texts 13a, 13b, metadata 14a, 14b, and images 15a, 15b.

Server 3 receives, as explained in FIG. 1, the video file including the metadata from server 2. Server 3 extracts voice data included in the received video file. The video file includes information of date and time for shooting as well. Herein the video file is defined as a video file shot by the wearable camera.

Time stamps 11a, 11b included in AT file 10 show the date and time when the voice extracted by server 3 is uttered. That is, the time stamps 11a, 11b show the date and time when a person appearing in the video picture of the video file utters.

Identifiers 12a, 12b are identifiers for identifying a speaker that utters voices. Server 3, for example, analyzes a voice sound of the extracted voice to identify a speaker having uttered the voice. Speakers A, B appear in an example in FIG. 4.

Texts 13a, 13b show texts of the voices extracted by server 3. Server 3 converts the voices extracted from the video file into texts 13a, 13b, and includes texts 13a, 13b in AT file 10. In the example in FIG. 4, it is understood that Speaker A utters "Freeze" and Speaker B utters "No".

Metadata 14a, 14b show metadata added at times shown by time stamps 11a, 11b or before/after the times (for example, before/after one minute). Server 3 extracts metadata 14a, 14b added at times shown by time stamps 11a, 11b or before/after the times and includes the metadata in AT file 10.

For example, in the example as shown in metadata 14a in FIG. 4, it is understood that the GPS information was obtained at 12:50:30 on the tenth of Apr. in 2018 or before/after that time. That is, the position of the wearable camera at 12:50:30 on the tenth of Apr. in 2018 or before/after that time is understood. In addition, it is understood that the Patlite is turned on at 12:50:30 on the tenth of Apr. in 2018 or before/after that time.

Images 15a, 15b show still images of the video file at the date and times shown by time stamps 11a, 11b. Server 3 extracts, for example, images 15a, 15b of the video file at the times shown by time stamps 11a, 11b and includes images 15a, 15b of the video file in AT file 10.

Server 3 transmits, as explained in FIG. 1, when AT file 10 of the video file is generated, AT file 10 of the video file to server 2. Server 2 stores AT file 10 transmitted from server 3 in the folder.

The user can browse AT file 10 stored in server 2 by using terminal apparatus 1. In addition, the user can reproduce the video picture from the times shown by time stamps 11a, 11b by clicking time stamps 11a, 11b of AT file 10 displayed on the display of terminal apparatus 1.

Figure 5A:
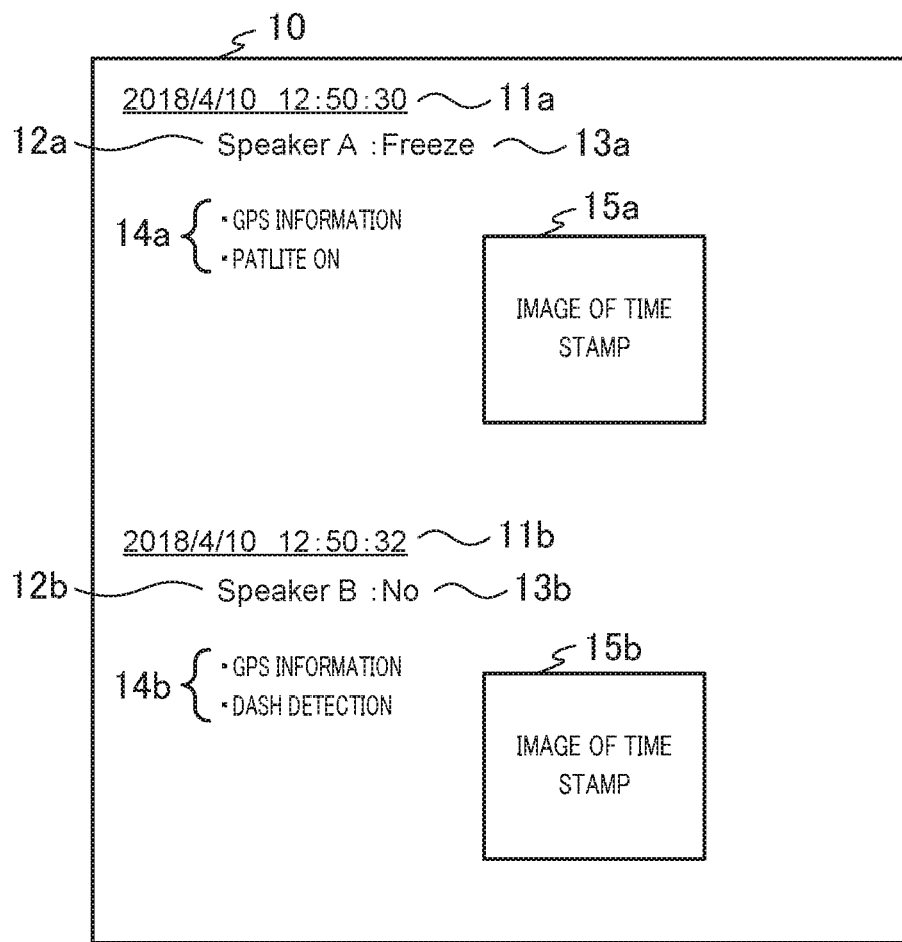
FIG. 5A is a diagram explaining an example of an operation of reproducing moving pictures from the AT file.
Figure 5B:
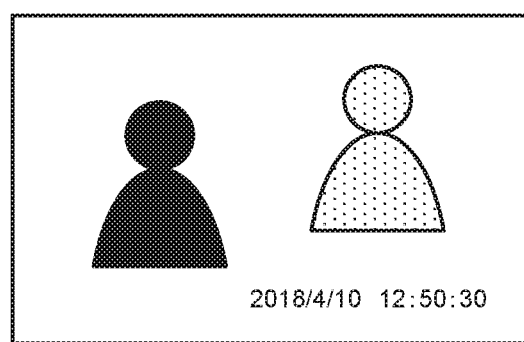
FIG. 5B is a diagram explaining an example of an operation of reproducing moving pictures from the AT file.

FIG. 5A and FIG. 5B are diagrams explaining an example of an operation of reproducing a moving picture from AT file 10. In FIG. 5A, components identical to those in FIG. 4 are referred to as identical reference signs.

AT file 10 is displayed on the display of terminal apparatus 1. Time stamps 11a, 11b of AT file 10 displayed on the display of terminal apparatus 1 are linked to the video file stored in the same folder as AT file 10. Time stamps 11a, 11b are linked such that the video pictures of the video file are reproduced from the times shown by time stamps 11a, 11b.

For example, when time stamp 11a displayed on the display of terminal apparatus 1 is clicked, server 2 stream-reproduces the video picture of the video file on the display of terminal apparatus 1 from the time shown at time stamp 11a. For example, a moving image as shown in FIG. 5B is displayed on the display of terminal apparatus 1.

A user refers to texts 13a, 13b, metadata 14a, 14b, and images 15a, 15b in AT file 10, making it possible to reproduce the video file from a desired location for viewing the video picture. For example, when the user desires to view a video picture from a location where the criminal escapes, the user views metadata 14b of "dash detection" or image 15b showing the state where the criminal dashes, the user is only required to click time stamp 11b.

Server 2 may stream-reproduce the video file on the display of terminal apparatus 1 from a short time before the time shown at time stamp 11a (for example, from 10 seconds before). Consequently the user can view how the situations and the like at the times of time stamps 11a, 11b have occurred.

Figure 6:
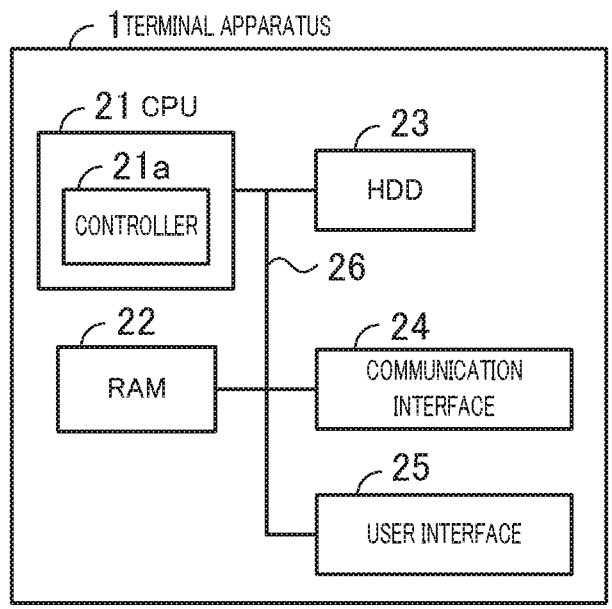
FIG. 6 is a diagram showing a block configuration example of a terminal apparatus.

FIG. 6 is a diagram showing a block configuration example of terminal apparatus 1. As shown in FIG. 6, terminal apparatus 1 includes central processing unit (CPU) 21, random access memory (RAM) 22, hard disk drive (HDD) 23, communication interface 24, user interface 25, and bus 26.

Entire terminal apparatus 1 is controlled by CPU 21. CPU 21 functions as controller 21a by executing programs. RAM 22, HDD 23, communication interface 24, and user interface 25 are connected to CPU 21 via bus 26.

Programs of an operation system (OS) and application programs to be executed by CPU 21 are temporarily stored in RAM 22. Further, various kinds of data required for processing by CPU 21 are temporarily stored in RAM 22.

The OS, application programs, and the like are stored in HDD 23.

Communication interface 24 makes communications with servers 2, 3 via the network.

For example, a key board apparatus, a display, and the like are connected to user interface 25. CPU 21 makes exchange of data with the key board apparatus, the display, and the like via user interface 25.

Figure 7:
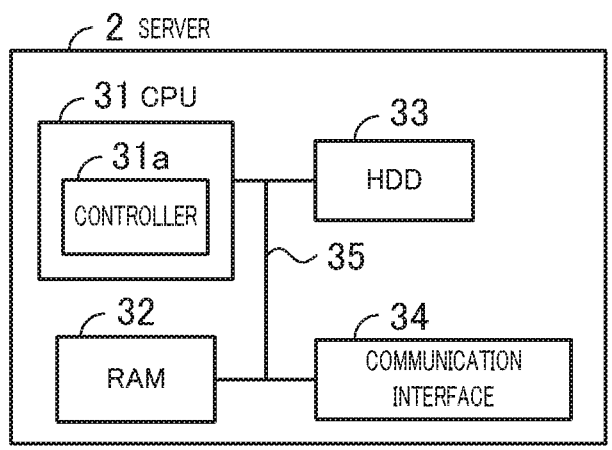
FIG. 7 is a diagram showing a block configuration example of a server.

FIG. 7 is a diagram showing a block configuration example of server 2. As shown in FIG. 7, server 2 includes CPU 31, RAM 32, HDD 33, communication interface 34, and bus 35.

Entire server 2 is controlled by CPU 31. CPU 31 functions as controller 31*a* by executing programs. RAM 32, HDD 33, and communication interface 34 are connected to CPU 31 via bus 35.

Programs of an OS and application programs to be executed by CPU 31 are temporarily stored in RAM 32. Further, various kinds of data required for processing by CPU 31 are temporarily stored in RAM 32.

The OS, the application programs, and the like are stored in HDD 33. A video file of the video picture shot by a wearable camera attached to a user and an on-vehicle camera mounted on a police vehicle is stored in HDD 33. The AT file generated by server 3 is stored in HDD 33. In addition, a general-purpose file generated based on the AT file is stored in HDD 33.

Communication interface 34 makes communications with terminal apparatus 1 and server 3 via a network. Further, communication interface 34 makes communications with the wearable camera attached to the user and the on-vehicle camera mounted on the police vehicle via the network.

Server 2 may be provided with a user interface. A key board apparatus, a display, and the like may be connected to the user interface.

Figure 8:
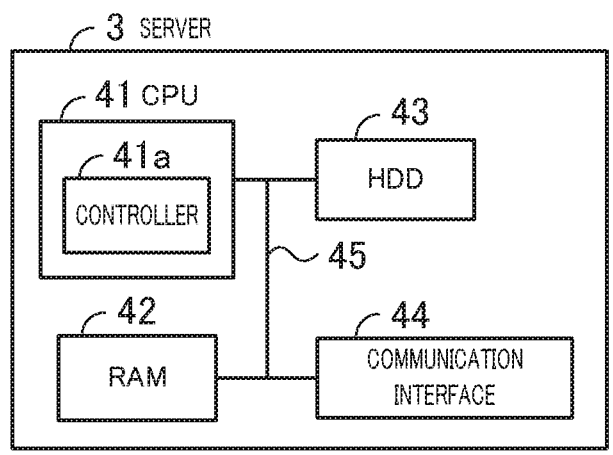
FIG. 8 is a diagram showing a block configuration example of a server.

FIG. 8 is a diagram showing a block configuration example of server 3. As shown in FIG. 8, server 3 includes CPU 41, RAM 42, HDD 43, communication interface 44, and bus 45.

Entire server 3 is controlled by CPU 41. CPU 41 functions as controller 41*a* by executing programs. RAM 42, HDD 43, and communication interface 44 are connected to CPU 41 via bus 45.

Programs of an OS and application programs to be executed by CPU 41 are temporarily stored in RAM 42. Further, various kinds of data required for processing by CPU 41 are temporarily stored in RAM 42.

The programs of the OS, the application programs, and the like to be executed by CPU 41 are stored in HDD 43.

Communication interface 44 makes communications with terminal apparatus 1 and server 2 via the network.

Server 3 may be provided with a user interface. For example, the key board apparatus, the display, and the like may be connected to the user interface.

Hereinafter, an explanation will be made of an operation example of the document production system by using screen examples to be displayed on the display of terminal apparatus 1 and a sequence diagram of the document production system.

The operation of the document production system is largely separated into two operations. A first operation is an operation of generating the AT file as shown in FIG. 4, for example. A second operation is an operation of generating a predetermined file (data) based on the AT file generated by the first operation, and is separated into two operations.

A first operation of the second operation (operation 2-1) is an operation of generating a report that can be browsed by a general-purpose application. A second operation (operation 2-2) is an operation of generating an AT file extracted in a partial range from the AT file. The range of the AT file to be extracted can be designated by a user.

Hereinafter, the operation 2-1 may be called a report generation operation. The operation 2-2 may be called an export operation. The AT file extracted in the partial range from the AT file may be called an export file.

<First Operation: Generation Operation of AT File>

FIG. 9A, FIG. 9B, and FIG. 9C are diagrams showing screen examples in the generation operation of the AT file. The screen examples to be explained hereinafter may be displayed in a browser. "Return" buttons displayed on the screen examples to be hereinafter explained have a common function in the respective screen examples, and when the return button is clicked, the screen returns back to the previous screen by one screen.

Screen 51*a* as shown in FIG. 9A is a screen for retrieving a case. Controller 31*a* of server 2 displays screen 51*a* on the display of terminal apparatus 1 in response to access from terminal apparatus 1. A user inputs information of a desired case of generating an AT file in a text box displayed on screen 51*a*.

In an example of screen 51*a*, the case number [NJ180425000011003] of the desired case of generating the AT file is input in the text box of the case number. When the user does not know the case number of the desired case of generating the AT file, for example, it is possible to retrieve the desired case of generating the AT file by inputting at least one of the date when the case occurs, the case type, the police officer name, and the police station name in the text box.

Screen 51*b* as shown in FIG. 9B shows a screen example of the retrieval result. Screen 51*b* is displayed on the display of terminal apparatus 1 when retrieval information is input in the text box of screen 51*a* in FIG. 9A and "retrieval" button is clicked.

For example, when the "retrieval" button on screen 51*a* as shown in FIG. 9A is clicked, controller 21*a* of terminal apparatus 1 transmits information input to the text box to server 2. Controller 31*a* of server 2 retrieves the case based on the information that is input to the text box and is transmitted from terminal apparatus 1. When controller 31*a* of terminal apparatus 1 retrieves the case, screen 51*b* as shown in FIG. 9B is displayed on the display of terminal apparatus 1.

The case number [NJ180425000011003] of the retrieved case is displayed on screen 51*b*. Information (type list) of the files stored in the folder of the retrieved case is displayed on screen 51*b*.

For example, "ICV video", "BWC video", "handwritten memorandum", and "site photograph" of screen 51*b* show types of the files stored in the folder of the retrieved case. For example, "ICV video" means a video file shot by the on-vehicle camera mounted on the police vehicle. "BWC video" means a video file shot by the wearable camera attached to a user.

Radio buttons are displayed on screen 51*b*. A user selects a radio button corresponding to a desired file for generating an AT file. For example, in a case where the user is desired to generate an AT file of a video file of "ICV video", the user selects a radio button corresponding to "ICV video". In addition, in a case where the user is desired to generate an AT file of a video file of "BWC video", the user selects a radio button corresponding to "BWC video".

Screen 51c as shown in FIG. 9C shows a screen example after a desired file for generating an AT file is selected. "BWC video" is selected on screen 51c.

When "convert into text from voice" button as shown on screen 51c is clicked, controller 21a of terminal apparatus 1 transmits information (in an example of screen 51c, information of "BWC video") of the file selected with the radio button by the user to server 2.

When controller 31a of server 2 receives the information of the file selected with the radio button by the user from terminal apparatus 1, controller 31a of server 2 transmits a copy of the file corresponding to the received information to server 3. Since in the example of screen 51c, "BWC video" is selected, controller 31a of server 2 transmits a copy of a video file of the wearable camera to server 3.

When controller 41a of server 3 receives the video file transmitted from server 2, controller 41a of server 3 extracts voice data and converts the extracted voice data into text data. Controller 41a of server 3 generates, for example, an AT file as shown in FIG. 4. When controller 41a of server 3 generates the AT file, controller 41a of server 3 transmits the generated AT file to server 2.

When controller 31a of server 2 receives the AT file from server 3, controller 31a of server 2 stores the received AT file in the folder in which the video file transmitted to server 3 is stored. Consequently the video file and the AT file of the video file are linked (stored in the folder of the same case) to be managed.

Thereby, a user accesses the folder of the case managed by server 2, making it possible to browse the AT file.

Figure 10:
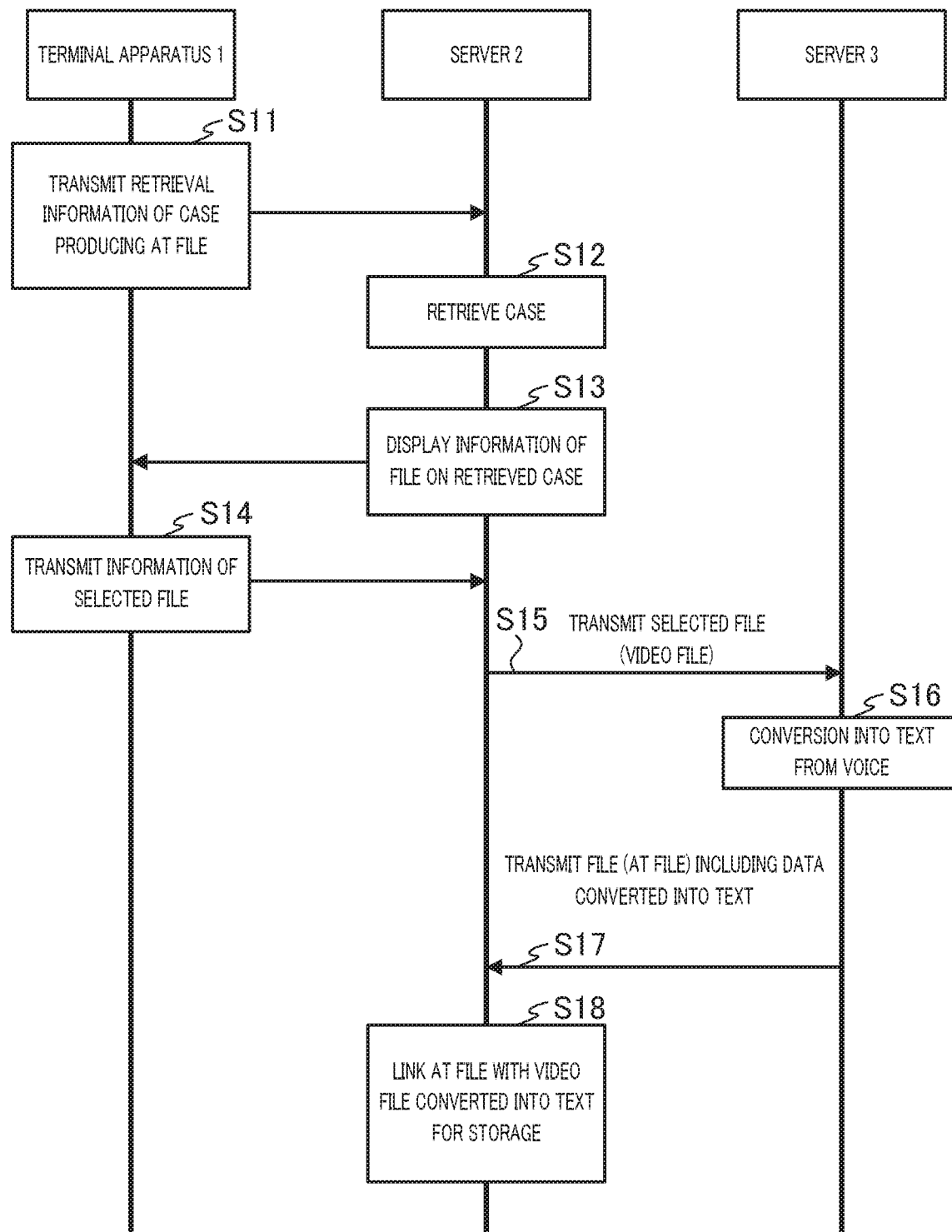
FIG. 10 is a sequence diagram showing an AT file generation operation example in a document production system.

FIG. 10 is a sequence diagram showing an AT file generation operation example of the document production system. Controller 21a of terminal apparatus 1 accesses server 2 in response to an operation of a user. Controller 31a of server 2 displays a screen for retrieving a case on the display of terminal apparatus 1 in response to the access from terminal apparatus 1 (for example, refer to screen 51a in FIG. 9A). The user inputs retrieval information of a desired case for generating an AT file on the retrieval screen of the display of terminal apparatus 1.

Controller 21a of terminal apparatus 1 transmits the retrieval information input by the user to server 2 (step S11).

Controller 31a of server 2 refers to HDD 33 to retrieve the case based on the retrieval information received in step S11 (step S12).

Controller 31a of server 2 displays type information (for example, refer to screen 51b in FIG. 9B) of files (for example, a video file, a voice file, an image file of a memorandum, and the like) stored in the folder of the case retrieved in step S12, on the display of terminal apparatus 1 (step S13).

The user selects a file of generating an AT file on the screen in step S13 (for example, selects a radio button on screen 51b in FIG. 9B).

Controller 21a of terminal apparatus 1 transmits information (for example, information of BWC video selected with the radio button on screen 51c in FIG. 9C) of the file of generating the AT file that is selected (designated) by the user to server 2 (step S14).

Controller 31a of server 2 obtains a file (video file) corresponding to the information of the file transmitted in step S14 from HDD 33, and transmits a copy of the obtained video file to server 3 (step S15).

Controller 41a of server 3 converts voices included in the video file transmitted in step S15 into text (step S16).

Controller 41a of server 3 transmits an AT file including the data converted into text to server 2 (step S17).

Controller 31a of server 2 links the AT file transmitted in step S17 to the video file (the video file transmitted in step S15) as a generation source of the AT file to be stored in HDD 33 (step S18). For example, controller 31a of server 2 stores the AT file in the folder in which the video file as the generation source of the AT file is stored.

Consequently the user accesses, for example, the folder of the case managed by server 2, making it possible to browse the AT file.

<Operation 2-1: Report Generation Operation>

FIG. 11A, FIG. 11B, FIGS. 11C, and 11D are diagrams showing screen examples in terminal apparatus 1 in the report generation operation.

Figures 11A, 11B:
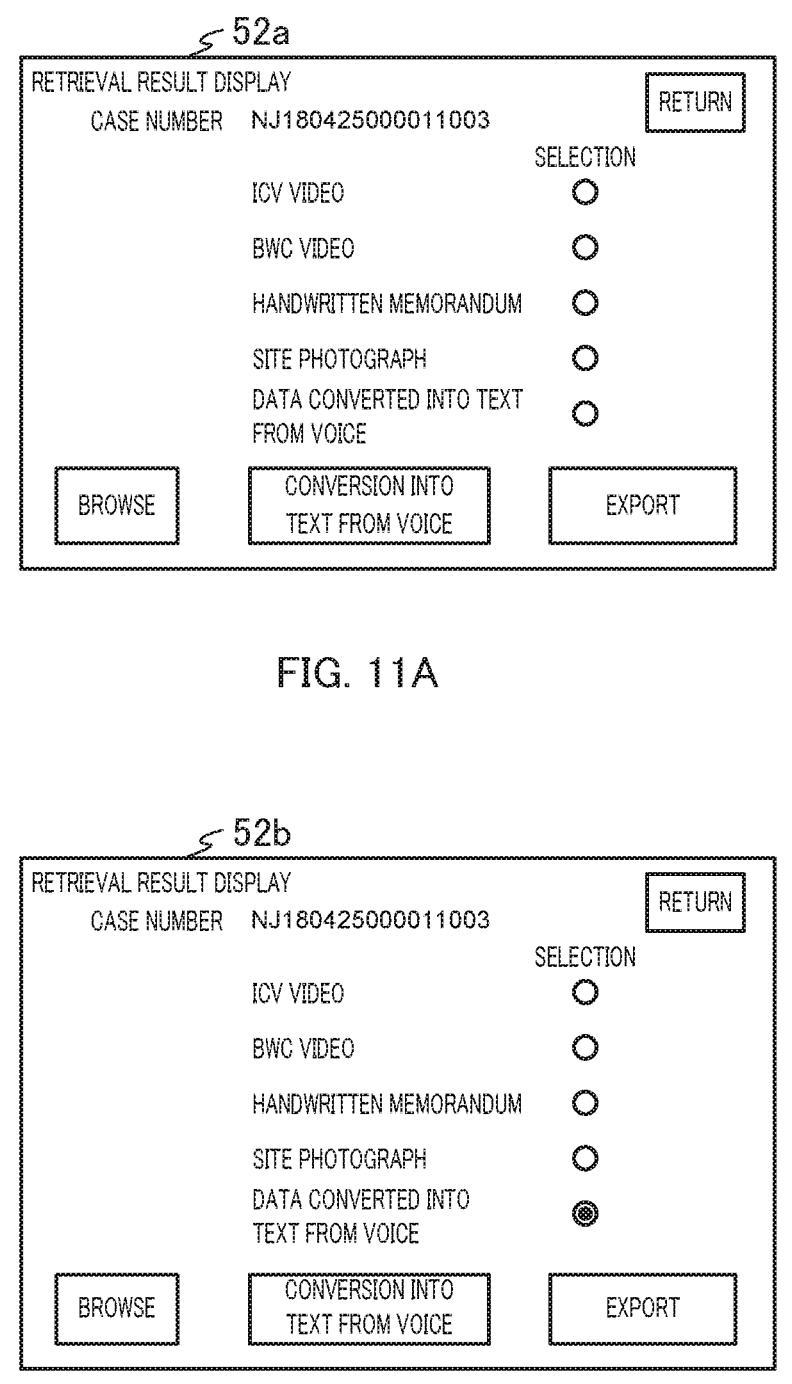

Screen 52a as shown in FIG. 11A shows a screen example after the retrieval of the case. For example, as explained in FIG. 9A, Screen 52a is displayed when retrieval information is input in the text box and "retrieval" button is clicked.

The case number [NJ180425000011003] of the retrieved case is displayed on screen 52a. A type list of the files stored in the folder of the retrieved case is displayed on screen 52a.

File information of "data converted into text from voice" is added to screen 52a, which is different from screen 51b of the retrieval result as shown in FIG. 9B. In other words, since the AT file is generated in the case of the case number [NJ180425000011003], the file information of "data converted into text from voice" is added to screen 52a.

Radio buttons are displayed on screen 52a. A user selects a radio button corresponding to a file that the user is desired to browse or view.

For example, in a case where the user is desired to browse "data converted into text from voice" (that is, in a case where the user is desired to browse the AT file generated in server 3) the user selects a radio button corresponding to "data converted into text from voice".

Screen 52b as shown in FIG. 11B shows a screen example after selecting a desired file for browsing or viewing. "Data converted into text from voice" is selected on screen 52b.

When "browsing" button as shown on screen 52b is clicked, controller 21a of terminal apparatus 1 transmits information (in an example of screen 52b, information of "data converted into text from voice") of the file selected with the radio button by the user, to server 2.

When controller 31a of server 2 receives the information of the file selected with the radio button by the user from terminal apparatus 1, controller 31a of server 2 transmits data of the file corresponding to the received information to terminal apparatus 1. Since in the example of screen 52b, "data converted into text from voice" is selected, controller 31a of server 2 obtains an AT file stored in the folder of the retrieved case and transmits the AT file to terminal apparatus 1. Controller 21a of terminal apparatus 1 displays the AT file transmitted from server 2 on the display.

Screen 52c as shown in FIG. 11C shows a screen example on which the AT file is displayed. The content of the AT file as explained in FIG. 4 is displayed on screen 52c, for example.

In a case where the user is desired, for example, to confirm the content of the AT file displayed on screen 52c and generate a report based on the confirmed content of the AT file, the user clicks "report production" button.

Controller 21a of terminal apparatus 1 transmits the information to which "report production" button is clicked to server 2. When controller 31a of server 2 receives the click information of "report production" button from terminal apparatus 1, controller 31a of server 2 transmits a screen for causing the user to select an output format and an output content of the report to be generated to terminal apparatus 1. Controller 21a of terminal apparatus 1 displays the information of the screen transmitted from server 2 on the display.

Screen 52d as shown in FIG. 11D shows a screen example on which the output format and the output content of the report are selected. For example, a pulldown menu for selecting the output format of the report is displayed on screen 52d. The user can select the output format of the report from the pulldown menu on screen 52d.

A check box for selecting information (output content) included in the report is displayed on screen 52d. In the example of screen 52d, metadata, a still image, and a time stamp link are included.

In a case where the metadata is selected, a text of the metadata is included in the report (for example, metadata 14a, 14b in FIG. 4 is included). In a case where the still image is selected, the still image when a speaker utters voices is included in the report (for example, images 15a, 15b in FIG. 4 are included). In a case where the time stamp link is selected, a link of the time stamp is included in the report (for example, refer to time stamps 11a, 11b in FIG. 4).

A plurality of pieces of information as information to be included in the report can be selected in accordance with the output format of the report to be selected in the pulldown menu. For example, when the output format of WORD or EXCEL (for example, "*.doc" or "*.xls" in the pulldown menu) is selected, it is possible to select the metadata, the still image, and the time stamp link. When the text ("*.txt" in the pulldown menu) is selected as the output format of the report, the still image and the time stamp link cannot be selected.

When "start" button on screen 52d is clicked, controller 21a of terminal apparatus 1 transmits the information input on screen 52d to server 2. Controller 31a of server 2 generates a report based on the information transmitted from terminal apparatus 1.

For example, in a case where the still image and the time stamp link are selected as the output content of the report, controller 31a of server 2 deletes the metadata from the data in the AT file to generate the report. In addition, in a case where "*.doc" is selected as the report output format, controller 31a of server 2 generates the report as "doc" file.

Figure 12:
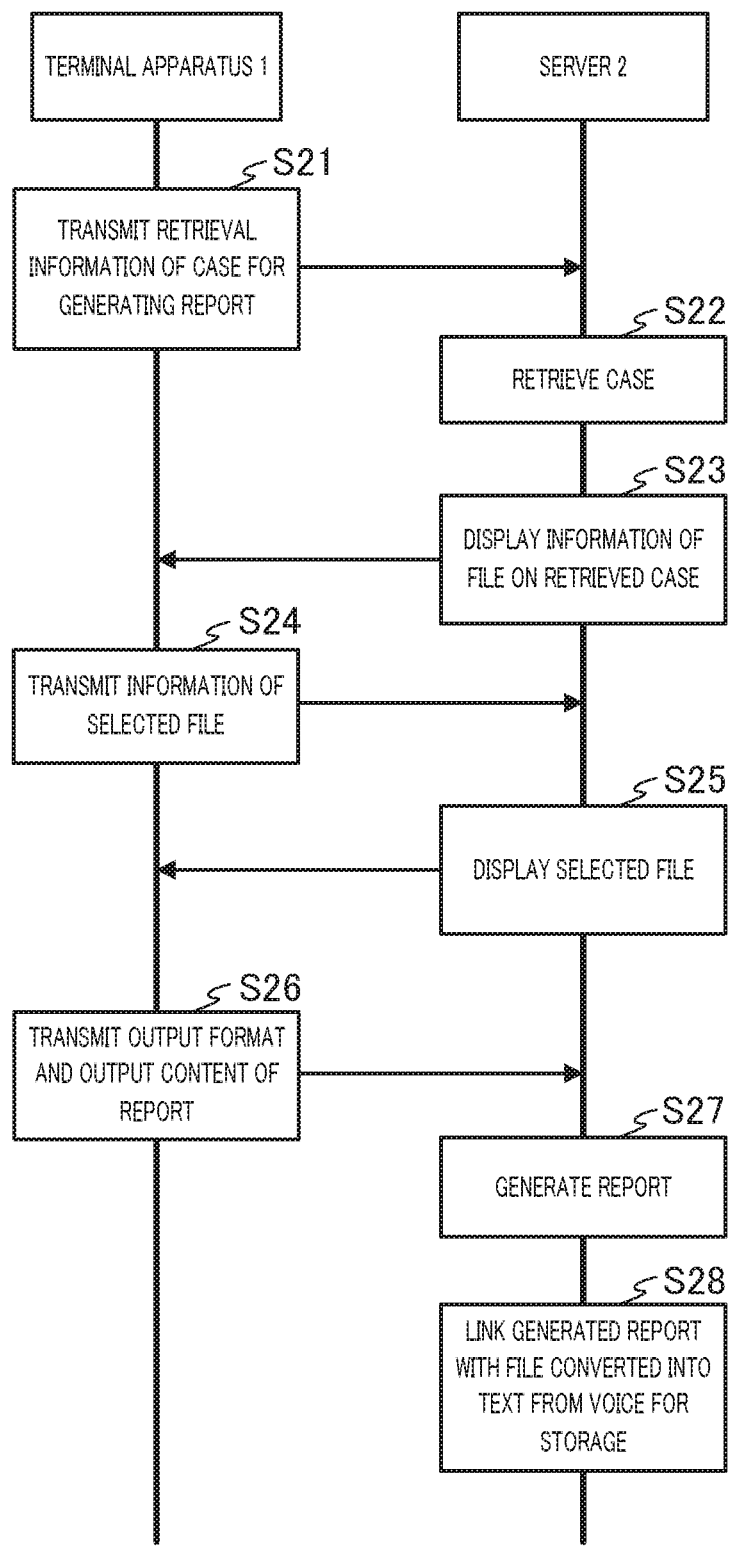
FIG. 12 is a sequence diagram showing a report generation operation example in the document production system.

FIG. 12 is a sequence diagram showing a report generation operation example of the document production system. The user uses terminal apparatus 1 to input retrieval information for retrieving a desired case for producing a report.

Controller 21a of terminal apparatus 1 transmits the retrieval information input by the user to server 2 (step S21).

Controller 31a of server 2 refers to HDD 33 to retrieve a case based on the retrieval information received in step S21 (step S22).

Controller 31a of server 2 displays type information (for example, refer to screen 52a in FIG. 11A) of the files (for example, a video file, a voice file, an image file of a memorandum, and the like) stored in the folder of the case retrieved in step S22, on the display of terminal apparatus 1 (step S23).

The user selects a file for generating a report on the screen in step S23. The user selects an AT file as the file for generating the report (for example, selects a radio button corresponding to "data converted into text from voice" on screen 52b in FIG. 11B).

Controller 21a of terminal apparatus 1 transmits the information (information of having selected the data converted into text from voice) selected by the user to server 2 (step S24).

Controller 31a of server 2 displays the image (for example, refer to screen 52c in FIG. 11C) of the file (AT file) of the information that is selected by the user and is transmitted in step S24, on the display of terminal apparatus 1 (step S25).

The button of the report production as well as the AT file are displayed on the display of terminal apparatus 1 (for example, refer to "report production" button on screen 52c in FIG. 11C). When "report production" button is clicked, controller 31a of server 2 displays a screen for selecting the output format and the output content of the report, on the display of terminal apparatus 1 (for example, refer to screen 52d in FIG. 11D). The user selects the output format and the output content of the report according to the screen of the display of terminal apparatus 1.

Controller 21a in terminal apparatus 1 transmits the output format and the output content of the report selected by the user to server 2 (step S26).

Controller 31a of server 2 edits data of the AT file based on the output format and the output content of the report transmitted in step S26 to generate the report (step S27). For example, in a case where the still image and the time stamp are selected as the output content of the report, controller 31a of server 2 deletes the metadata from the data in the AT file to generate the report. In addition, in a case where "*.doc" is selected as the report output format, controller 31a of server 2 generates the report as "doc" file.

Controller 31a of server 2 links the report generated in step S27 to the AT file (the AT file transmitted in step S24) to store the report in HDD 33 (step S28). For example, controller 31a of server 2 stores the report in the folder in which the AT file as the source of the report generation is stored.

Consequently the user accesses, for example, the folder of the case managed by server 2, making it possible to browse the report. The user can edit the generated report.

<Operation 2-2: Export Operation>

FIG. 13A, FIG. 13B, FIG. 13C, and FIG. 13D are diagrams showing screen examples in terminal apparatus 1 in the export operation.

Figure 13A:
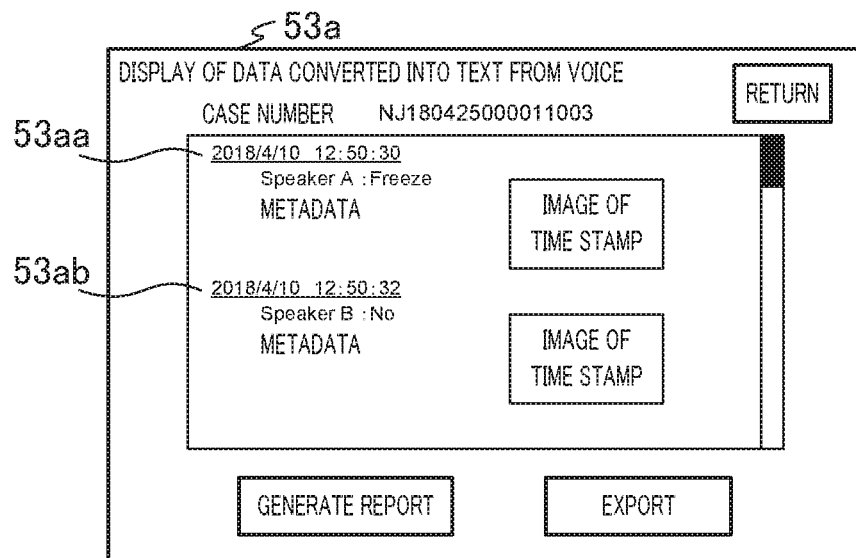
FIG. 13A is a diagram showing a screen example of the terminal apparatus in an export operation.

Screen 53a as shown in FIG. 13A shows a screen example after a desired file for browsing or viewing is selected. Screen 53a, for example, corresponds to screen 52c as explained in FIG. 11C.

For example, screen 53a shows a screen example on which after the case is retrieved by server 2, information of files in the folder of the retrieved case is displayed on the display of terminal apparatus 1, and a desired file for browsing or viewing is selected by the user. The content of the AT file as explained in FIG. 4 is displayed on screen 53a.

Time stamps 53aa, 53ab are displayed on screen 52a. Time stamps 53aa, 53ab are linked with the video file as the source of the AT file. When time stamps 53aa, 53ab on screen 52a are clicked, controller 31a of server 2 displays a video reproduction screen on the display of terminal apparatus 1. Controller 31a of server 2 displays the video reproduction screen on which video reproduction is made possible from times shown at time stamps 53aa, 53ab or from times prior to those times by a small amount (these times may be set by the user).

Figure 13B:
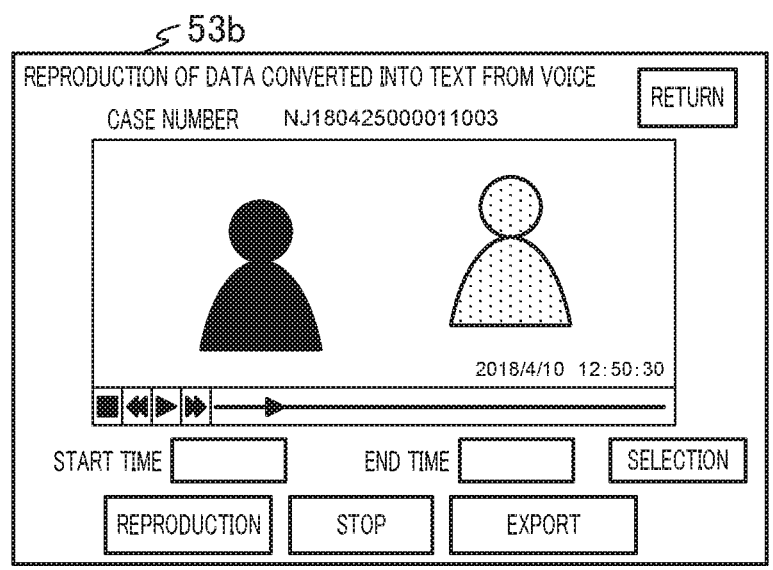
FIG. 13B is a diagram showing a screen example of the terminal apparatus in the export operation.

Screen 53b as shown in FIG. 13B shows a screen example in a case where time stamp 53aa on screen 53a is clicked.

When time stamp 53aa is clicked, controller 21a of terminal apparatus 1 transmits link information linked with time stamp 53aa to server 2.

When controller 31a of server 2 receives the link information from terminal apparatus 1, controller 31a of server 2 displays the video reproduction screen on the display of terminal apparatus 1 based on the link information. The user can make operations of reproduction, temporal stop, stop, fast-forward, quick return, and the like of a video on the display of terminal apparatus 1.

The user clicks, for example, one or more of time stamps to view the video. The user views the video, and as a result, designates a range of a desired video picture for export from the video file on the display of terminal apparatus 1.

For example, the user designates a start time of a desired video for export on the display of terminal apparatus 1. The user designates an end time of the desired video for export on the display of terminal apparatus 1.

Figure 13C:
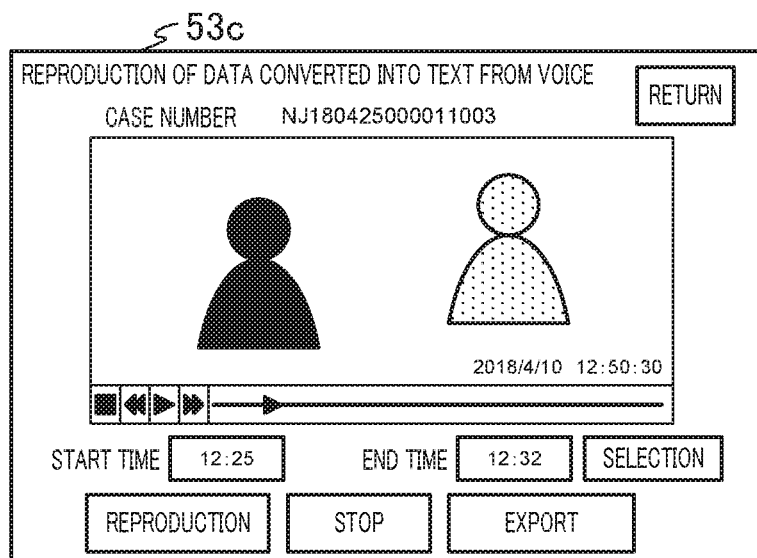
FIG. 13C is a diagram showing a screen example of the terminal apparatus in the export operation.

Screen 53c as shown in FIG. 13C shows a screen example on which the export range is input. In the example of screen 53c, "12:25" is input in a text box of "start time" for starting the export. In the example of screen 53c, "12:32" is input in a text box of "end time" for ending the export.

For example, when a desired video picture for starting the export is displayed during the browsing of the video, the user may click "selection" button on screen 53c. Controller 21a of terminal apparatus 1 may input a time in the video in the middle of reproduction in the text box of "start time" in response to the clicking of "selection" button. When "selection" button is next clicked, controller 21a of terminal apparatus 1 may input a time in the video in the middle of reproduction in the text box of "end time".

When the export range of the video file is designated and "export" button is clicked, controller 21a of terminal apparatus 1 displays a screen for selecting the export content on the display.

Figure 13D:
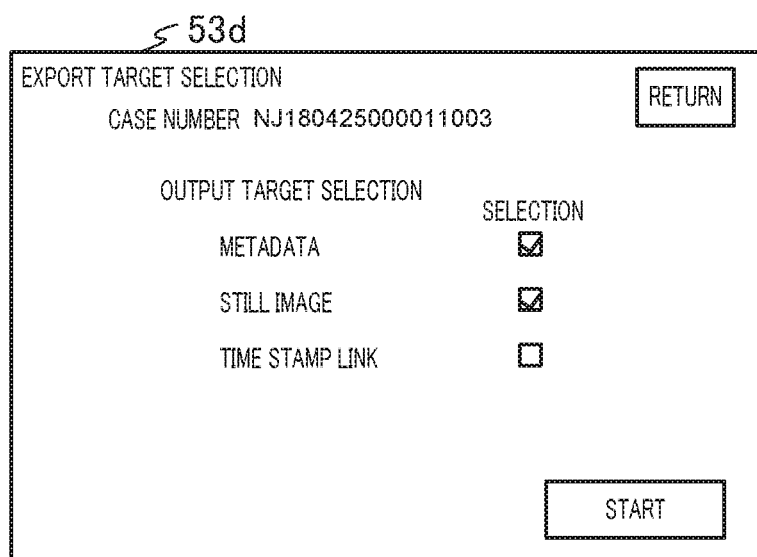
FIG. 13D is a diagram showing a screen example of the terminal apparatus in the export operation.

Screen 53d as shown in FIG. 13D shows a screen example for selecting the export content (target). The user designates the content for export on the display of terminal apparatus 1. The content for export includes metadata, a still image, and a time stamp link, for example.

The content for export may be all or partially selected. For example, in a case where the metadata and the still image are exported and the time stamp link is not exported, the user inputs checks to a check box corresponding to the metadata and a check box corresponding to the still image.

When the export range of the video file is designated and "start" button is clicked, controller 21a of terminal apparatus 1 transmits information of the export range input on screen 53c in FIG. 13C and information of the export content selected on screen 53d in FIG. 13D to server 2.

Controller 31a of server 2 edits an AT file based on the information of the export range and the information of the export content transmitted from terminal apparatus 1. For example, controller 31a of server 2 deletes a video content out of the export range and information other than the information designated in the export content to generate an AT file.

Figure 14:
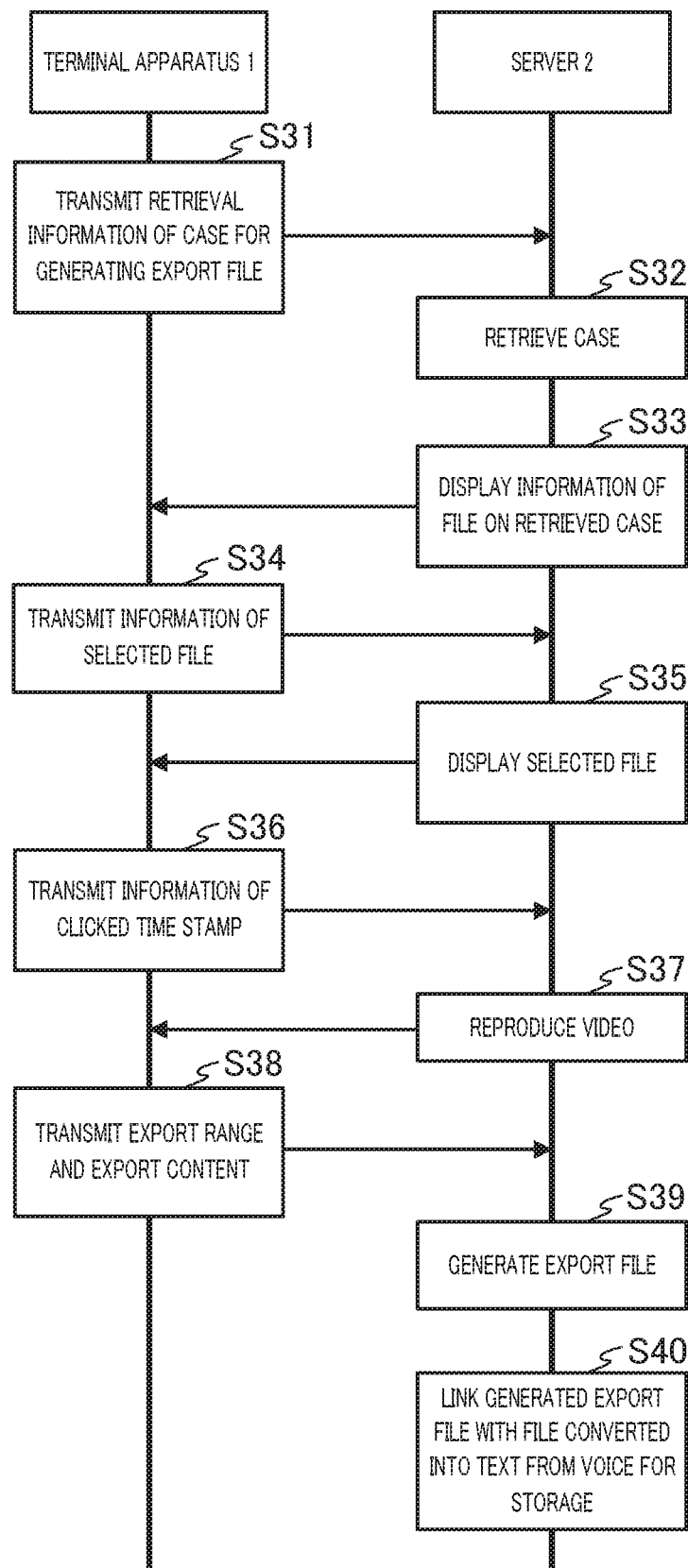
FIG. 14 is a sequence diagram showing an export operation example in the document production system.

FIG. 14 is a sequence diagram showing an export operation example of the document production system. The user uses terminal apparatus 1 to input retrieval information for retrieving a desired case for producing an export file.

Controller 21a of terminal apparatus 1 transmits the retrieval information input by the user to server 2 (step S31).

Controller 31a of server 2 refers to HDD 33 to retrieve a case based on the retrieval information received in step S31 (step S32).

Controller 31a of server 2 displays type information (for example, refer to screen 52a in FIG. 11A) of files (for example, a video file, a voice file, an image file of a memorandum, an AT file, and the like) stored in the folder of the case retrieved in step S32, on the display of terminal apparatus 1 (step S33).

The user selects an AT file (data converted into text from voice) for generating an export file on the screen in step S33 (for example, the user selects a radio button corresponding to "data converted into text from voice" on screen 52b in FIG. 11B).

Controller 21a of terminal apparatus 1 transmits the information (information where the AT file is selected) that is selected by the user to server 2 (step S34).

Controller 31a of server 2 displays a content (for example, refer to screen 53a in FIG. 13A) of the file (AT file) of the information that is selected by the user and is transmitted in step S34, on the display of terminal apparatus 1 (step S35).

The time stamp is displayed on the AT file to be displayed on the display of terminal apparatus 1 (for example, time stamps 53aa, 53ab on screen 53a in FIG. 13A).

When the time stamp is clicked, controller 31a of server 2 transmits information of the clicked time stamp to server 2 (step S36).

When controller 311a of server 2 receives the information of the time stamp, controller 31a of server 2 reproduces the video file from a location linked with the time of the time stamp and displays the video file on the display of terminal apparatus 1 (for example, refer to screen 53b in FIG. 13B) (step S37).

The user views a video displayed on the display of terminal apparatus 1 and can designate a desired range for producing the export file. For example, the user can designate a desired range for producing the export file based on the time within the video picture (for example, refer to a start time and an end time on screen 53c in FIG. 13C). The user makes operations of reproduction, quick return, and the like of the video to repeatedly view the video, making it possible to designate the desired range for producing the export file. Further, the user clicks another time stamp to reproduce a video picture in another time, making it possible to view the video picture.

The user selects the export content on the display of terminal apparatus 1. For example, the user selects the metadata, the still image, and the time stamp link as the content to be included in the export file (refer to the check box on screen 53d in FIG. 13D).

Controller 21a of terminal apparatus 1 transmits the export range and the export content designated by the user to server 2 (step S38).

Controller 31a of server 2 generates an export file based on the export range and the export content transmitted in step S38 (step S39).

Controller 31a of server 2 links the export file generated in step S39 with the AT file to store the export file in HDD 33 (step S40). For example, controller 31a of server 2 stores the export file in the folder in which the AT file as the source of the export file is stored.

As explained above, controller 31a of server 2 configuring the information processing apparatus obtains the video file designated by terminal apparatus 1 from HDD 33 in which the video file of the video picture shot by the wearable camera attached to or owned by the police officer or by the on-vehicle camera mounted on the police vehicle is stored. Controller 41a of server 3 configuring the information processing apparatus extracts the voice data included in the video file obtained by server 2 and converts the extracted voice data into the text data. Communication interface 34 of server 2 configuring the information processing apparatus transmits the AT file including text data converted in server 3 to terminal apparatus 1. In this way, since the information processing apparatus generates the text data from the video file of the video picture shot by the wearable camera attached to the police officer or by the on-vehicle camera mounted on the police vehicle, the production of the report associated with the case by the user is made easy.

In the above description, controller 41a of server 3 converts the voice data of the video file into the text data, but is not limited thereto. For example, controller 41a of server 3 may convert the voice data in the voice file into the text data. For example, a voice file recorded by an IC recorder or the like may be stored in HDD 33 of server 2. In a case where the user designates the voice file as the data for producing the AT file, controller 31a of server 2 transmits the designated voice file to server 3. Controller 41a of server 3 may convert the voice data transmitted from server 2 into the text data and transmit the AT file including the converted text data to server 2.

In the above description, the metadata is added to the video data in the video file, but is not limited thereto. The metadata may be managed by a file different from the video file. In this case, controller 31a of server 2 transmits the video file (to which the metadata is not added) and the file of the metadata to server 3. Controller 41a of server 3 generates an AT file based on the video file and the file of the metadata transmitted from server 2.

In the above description, controller 31a of server 2 generates the report from the AT file, but may generate the report from the export file. For example, in a case where the export file is generated, the file type showing the export file and the radio button for being capable of selecting the export file are displayed on screen 52a in FIG. 11A. In a case where the radio button of the export file is selected, controller 31a of server 2 generates a report from the export file.

In a case where the time stamp is clicked on screen 52c in FIG. 11C, controller 31a of server 2 may display the reproduction screen of the video file on the display of terminal apparatus 1 as similar to screen 53c in FIG. 13C.

Embodiment 2

In Embodiment 2, a summary video file is generated from a video file of a video picture shot by a camera. For example, in some cases a portion that becomes important as a case (for example, a portion as a report target) is a part of the video picture shot by a camera. Therefore in Embodiment 2, a portion that becomes important as the report target is extracted out of the video picture shot by the camera, and a summary video file including the extracted video picture is generated.

Figure 15:
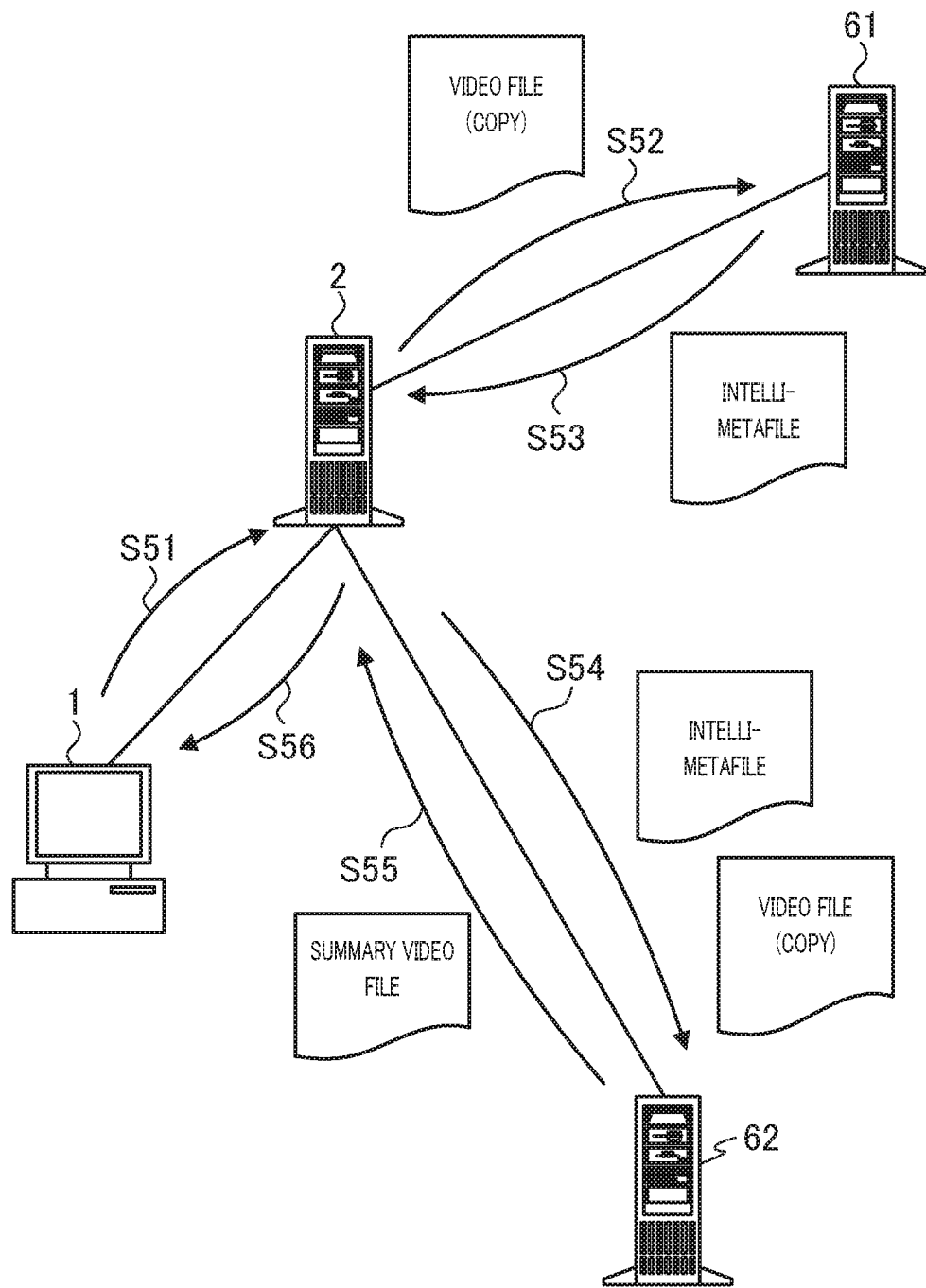
FIG. 15 is a diagram showing an example of a summary video generation system according to Embodiment 2.

FIG. 15 is a diagram showing an example of a summary video generation system according to Embodiment 2. In FIG. 15, components identical to those in FIG. 1 are referred to as identical reference signs. The summary video generation system includes terminal apparatus 1 and servers 2, 61, 62.

Hereinafter, portions different from those in FIG. 1 will be explained. FIG. 15 shows terminal apparatus 1 and server 2 as shown in FIG. 1, and besides servers 61, 62. Terminal apparatus 1, server 2, server 61, and server 62 can communicate with each other through a network, for example, a LAN or the Internet.

Functions of servers 2, 61, 62 may be realized by a single or two servers. The functions of servers 2, 61, 62 may be realized by four or more servers. Servers 2, 61, 62 may be assumed as a single information processing apparatus. That is, the information processing apparatus may be assumed to be configured of servers 2, 61, 62. The information processing apparatus may be configured of one or more servers.

Server 61 generates an intelligent metafile. Intelligent metadata is included in the intelligent metafile. Hereinafter, the intelligent metafile may be called an intelli-metafile. In addition, the intelligent metadata may be called an intelli-metadata. Server 61 may be provided with a function of an artificial intelligence (AI).

The intelli-metadata is, as similar to the metadata explained in FIG. 2, information on an event that occurs associated with a case. The metadata is generated by a camera and is added to the video file, and on the other hand, the intelli-metadata is generated by server 61.

Server 2 transmits a video file as a generation source of the intelli-metafile to server 61. Server 61 analyzes a video picture (including voices) transmitted from server 2 to generate intelli-metadata and an intelli-metafile.

A wearable camera or an on-vehicle camera is limited in processing capabilities more than the server. Therefore the metadata to be added to the video file is limited to, for example, the information shown in FIG. 2. Therefore server 61 receives a video file of a video picture shot by a camera from server 2 and analyzes the video picture to generate intelli-metadata (for example, refer to FIG. 16). That is, server 61 generates the metadata (intelli-metadata) that a camera cannot generate. Server 61 transmits an intelli-metafile including the generated intelli-metadata to server 2.

Server 2 manages, for example, as explained also in FIG. 1, folders separated for respective cases. Server 2 stores the intelli-metafile transmitted from server 61 in the folder separated for each case. For example, server 2 stores the intelli-metafile in the same folder as the video file as the generation source of the intelli-metafile.

Server 62 generates a summary video file in which a video picture of a video file is summarized. For example, server 62 receives a copy of the video file as a source of the summary video file and an intelli-metafile of the video file from server 2. Server 62 refers to the intelli-metafile received from server 2 and extracts a video picture as a report target from the video file received from server 2 to generate a summary video file.

Server 62 transmits the generated summary video file to server 2. Server 2 stores the summary video file transmitted from server 62 in the same folder as the video file as the source of the summary video file.

An explanation will be made of a schematic operation example of the summary video generation system in FIG. 15. For example, a user as a police officer uses terminal apparatus 1 to select (retrieve) a desired case for generating a summary video. Herein it is assumed that the user selects case A as a desired case for generating the summary video. Terminal apparatus 1 transmits information of selected case A to server 2 (step S51).

When server 2 receives the information of case A transmitted from terminal apparatus 1, server 2 obtains a video file from a folder corresponding to case A. Server 2 transmits a copy of the obtained video file to server 61 (step S52). The metadata (for example, refer to FIG. 2) added by a camera is added to the video file.

Server 61 analyzes the video picture in the video file transmitted from server 2 to generate intelli-metadata and generate an intelli-metafile including the generated intelli-metadata. Server 61 transmits the generated intelli-metafile to server 2 (step S53).

Server 2 stores the intelli-metafile of case A transmitted from server 61 in the folder of case A. Consequently the video file and the intelli-metafile of case A are stored (saved) in the folder of case A.

Server 2 transmits the intelli-metafile transmitted from server 61 and a copy (copy of the video file of case A) of the video file as a generation source of the intelli-metafile to server 62 (step S54).

Server 62 refers to the intelli-metafile transmitted from server 2 to extract a video picture of a portion as a report target from the video file transmitted from server 2, generating a summary video file.

Server 62 transmits the generated summary video file to server 2 (step S55).

Server 2 stores the summary video file transmitted from server 62 in the folder of case A. Consequently the video file, the intelli-metafile, and the summary video file of case A are stored (saved) in the folder of case A of server 2.

Server 2 displays the video picture of the summary video file transmitted from server 62 on the display of terminal apparatus 1 (step S56). Consequently the user can browse the video picture in which the portion as the report target is extracted.

In this way, the summary video generation system analyzes the video picture in the video file to generate the intelli-metafile. The summary video generation system extracts the video picture of the portion as the report target from the video file based on the generated intelli-metafile to generate the summary video file.

Consequently the user can easily browse the video picture of the portion as the report target. For example, the user can eliminate time and effort for looking for the video picture of the portion as the report target to easily browse the video picture of the portion as the report target. Further, the user can generate the report explained in Embodiment 1 from the summary video file. That is, the user can easily generate a report of an important portion of a case.

FIG. 16 is a diagram explaining an example of the intelli-metadata. The intelli-metadata includes, for example, data as shown in FIG. 16. The intelli-metadata is generated by server 61 as explained in FIG. 15.

"Person detection/non-detection" of the intelli-metadata is generated when server 61 detects a person and does not detect a person for a constant time in the video picture of the video file.

"Vehicle detection/non-detection" of the intelli-metadata is generated when server 61 detects a vehicle and does not detect a vehicle for a constant time in the video picture of the video file.

"Abnormal behavior detection/non-detection" of the intelli-metadata is generated when server 61 detects an abnormal behavior of a person and does not detect an abnormal behavior of a person for a constant time in the video picture of the video file.

"Crowd of people detection/non-detection" of the intelli-metadata is generated when server 61 detects a crowd of people and does not detect a crowd of people for a constant time in the video picture of the video file.

"Conversation detection/non-detection" of the intelli-metadata is generated when server 61 detects a conversation and does not detect a conversation for a constant time in the video picture of the video file.

"Gunshot detection/non-detection" of the intelli-metadata is generated when server 61 detects a gunshot and does not detect a gunshot for a constant time in the video picture of the video file.

"Explosion sound detection/non-detection" of the intelli-metadata is generated when server 61 detects an explosion sound and does not detect an explosion sound for a constant time in the video picture of the video file.

"Constant time" as "does not detect for a constant time" as described above may be set by the user.

FIG. 17 is a diagram explaining a generation example of the intelli-metafile. FIG. 17 shows a partial frame of the video picture shot by the wearable camera. A horizontal axis in FIG. 17 shows time.

Server 61 analyzes a video picture in a video file to generate intelli-metadata. Server 61 associates the generated intelli-metadata with a time of the video picture as a generation source of the intelli-metadata to generate an intelli-metafile.

For example, at time t2 server 61 is assumed to detect that a person disappears from the video picture in the video file. In this case, server 61 generates intelli-metadata (tag) of "person non-detection" to associate the intelli-metadata (tag) with time t2. In addition, at time t2 server 61 is assumed to detect that the conversation disappears from the video picture in the video file. In this case, server 61 generates intelli-metadata of "conversation non-detection" to associates the intelli-metadata with time t2. Server 61 generates an intelli-metafile including the intelli-metadata associated with the time in the video picture in the video file.

Patlite ON, dash start, and manual record OFF as shown in FIG. 17 are metadata added by a wearable camera.

FIG. 18 is a diagram explaining a generation example of a summary video file. Video data, a tag, metadata, and intelli-metadata as shown in FIG. 18 are the same as the video data, the tag, the metadata, and the intelli-metadata as shown in FIG. 17. FIG. 18 shows summary video data to FIG. 17.

Server 62 extracts a video picture of a portion as a report target from the video file based on the metadata included in the video file and the intelli-metadata included in the intelli-metafile to generate a summary video file.

For example, when Patlite is turned on, a case is assumed to occur. On the other hand, in a case where a person is not included and a conversation is not included in the video picture for a constant time after the Patlite is turned on, an important video picture as a report target of a case is assumed to be not included in the video picture after that. When a user (user wearing a wearable camera) starts to run, the important video picture as the report target of the case is assumed to be included.

Therefore server 62 forms, for example, as shown in arrows A1 to A3 in FIG. 18, video picture data (frame) to a tag of person non-detection and a tag of conversation non-detection (intelli-metadata) after a tag (metadata) of the Patlite ON as data (frame) of the summary video file. Server 62 deletes, for example, as shown in arrows A4 to A6 in FIG. 18, the video picture data after the tag of person non-detection and the tag of conversation non-detection. Further, server 62 forms, as shown in arrows A7, A8 in FIG. 18, video picture data after a tag (metadata) of a dash start as data of the summary video file.

Figure 19:
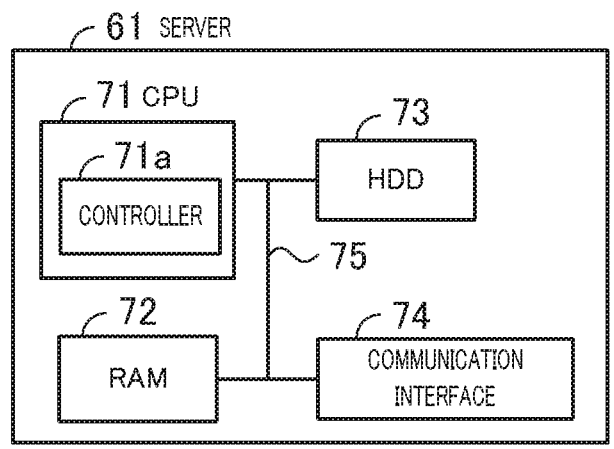
FIG. 19 is a diagram showing a block configuration example of a server.

FIG. 19 is a diagram showing a block configuration example of server 61. As shown in FIG. 19, server 61 includes CPU 71, RAM 72, HDD 73, communication interface 74, and bus 75.

Entire Server 61 is controlled by CPU 71. CPU 71 functions as controller 71a by executing programs. RAM 72, HDD 73, and communication interface 74 are connected to CPU 71 via bus 75.

Programs of an OS and application programs to be executed by CPU 71 are temporarily stored in RAM 72. Further, various kinds of data required for processing by CPU 71 are temporarily stored in RAM 72.

The programs of the OS, the application programs, and the like to be executed by CPU 71 are stored in HDD 73.

Communication interface 74 makes communications with server 2 via the network.

Server 61 may be provided with a user interface. For example, a key board apparatus, a display, and the like may be connected to the user interface.

Figure 20:
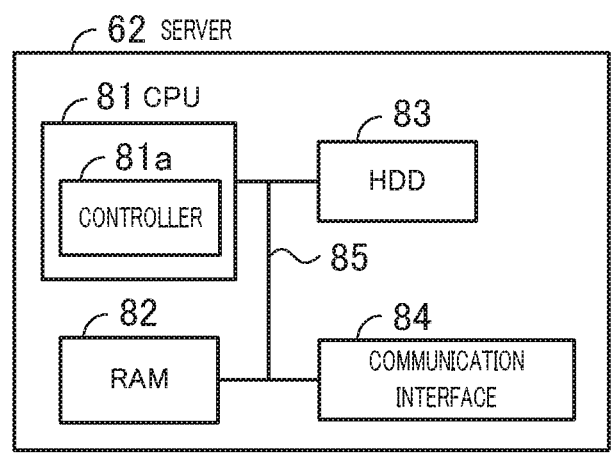
FIG. 20 is a diagram showing a block configuration example of the server.

FIG. 20 is a diagram showing a block configuration example of server 62. As shown in FIG. 20, server 62 includes CPU 81, RAM 82, HDD 83, communication interface 84, and bus 85.

Entire Server 62 is controlled by CPU 81. CPU 81 functions as controller 81a by executing programs. RAM 82, HDD 83, and communication interface 84 are connected to CPU 81 via bus 85.

Programs of an OS and application programs to be executed by CPU 81 are temporarily stored in RAM 82. Further, various kinds of data required for processing by CPU 81 are temporarily stored in RAM 82.

The programs of the OS, the application programs, and the like to be executed by CPU 81 are stored in HDD 83.

Communication interface 84 makes communications with server 2 via a network.

Server 62 may be provided with a user interface. For example, a key board apparatus, a display, and the like may be connected to the user interface.

Hereinafter, an explanation will be made of an operation example of the summary video generation system by using screen examples to be displayed on the display of terminal apparatus 1 and a sequence diagram of the summary video generation system.

The operation of the summary video generation system is largely separated into two operations. A first operation is an operation of generating an intelli-metafile including intelli-metadata and generating the summary video file (summary video data) as shown in FIG. 18. A second operation is an operation of utilizing the summary video file generated by the first operation, and is separated into three operations.

A first operation of the second operation (operation 2-1) is an operation of browsing the summary video file. A second operation (operation 2-2) is an operation of generating a summary video file extracted in a partial range from the summary video file. A third operation (operation 2-3) is an operation of generating an AT file from the summary video file.

Hereinafter, the operation 2-2 may be called an export operation. The summary video file extracted in a partial range from the summary video file may be called an export file.

<First Operation: Generation Operation of Summary Video File>

FIG. 21A, FIG. 21B, FIG. 21C, and FIG. 21D are diagrams showing screen examples of terminal apparatus 1 in the generation operation of the summary video file.

Screen 91a as shown in FIG. 21A is displayed when terminal apparatus 1 accesses server 2, for example. Controller 31a of server 2 displays screen 91a on the display of terminal apparatus 1 in response to the access from terminal apparatus 1.

Screen 91a is a screen for retrieving a case. The user inputs information of a desired case for generating a summary video file in a text box displayed on screen 91a, thereby making it possible to retrieve the desired case for generating the summary video file.

In an example of screen 91a, the case number [NJ180425000011003] of a desired case for generating a summary video file is input in a text box of the case number. When the user does not know the case number of the desired case for generating the summary video file, for example, it is possible to retrieve the desired case for generating the summary video file by inputting at least one of the date when the case occurs, the case type, the police officer name, and the police station name in the text box.

Screen 91b as shown in FIG. 21B shows a screen example of the retrieval result. Screen 91b is displayed on the display of terminal apparatus 1 when retrieval information is input in the text box of screen 91a in FIG. 21A and the "retrieval" button is clicked.

For example, when the "retrieval" button on screen 91a as shown in FIG. 21A is clicked, controller 21a of terminal apparatus 1 transmits the information input to the text box to server 2. Controller 31a of server 2 retrieves the desired case for the user to generate the summary video file, based on the information that is input to the text box and is transmitted from terminal apparatus 1. When controller 31a of server 2 retrieves the case, screen 91b as shown in FIG. 21B is displayed on the display of terminal apparatus 1.

The case number [NJ180425000011003] of the retrieved case is displayed on screen 91b. A type list of the files stored in a folder of the retrieved case is displayed on screen 91b.

For example, "ICV video", "BWC video", "handwritten memorandum", and "site photograph" of screen 91b show types of the files stored in the folder of the retrieved case. For example, "ICV video" means a video file shot by the on-vehicle camera mounted on the police vehicle. "BWC video" means a video file shot by the wearable camera attached to a user.

Radio buttons are displayed on screen 91b. A user selects a radio button corresponding to a desired file for generating a summary video file. For example, in a case where the user is desired to generate a summary video file of a video file of "ICV video", the user selects a radio button corresponding to "ICV video". In addition, in a case where the user is desired to generate a summary video file of a video file of "BWC video", the user selects a radio button corresponding to "BWC video".

Screen 91c as shown in FIG. 21C shows a screen example after a desired file for generating the summary video file is selected. "BWC video" is selected on screen 91c.

When "video summary" button as shown on screen 91c is clicked, controller 21a of terminal apparatus 1 transmits information (in an example of screen 91c, information of "BWC video") of the file selected with the radio button by the user to server 2.

When controller 31a of server 2 receives the information of the file selected with the radio button by the user from terminal apparatus 1, controller 31a of server 2 transmits a copy of the file corresponding to the received information to server 61. Since in the example of screen 91c, "BWC video" is selected, controller 31a of server 2 transmits a copy of the video file of the wearable camera to server 61.

When controller 71a of server 61 receives the video file transmitted from server 2, controller 71a of server 61 analyzes a video picture of the received video file to generate intelli-metadata and generates an intelli-metafile. When controller 71a of server 61 generates the intelli-metafile, controller 71a of server 61 transmits the generated intelli-metafile to server 2.

When server 2 receives the intelli-metafile from server 61, server 2 stores the intelli-metafile in the folder in which the video file transmitted to server 61 is stored. Consequently the video file and the intelli-metafile of the video file are linked (stored in the folder of the same case) to be managed. When controller 31a of server 2 stores the intelli-metafile received from server 61 in the folder, controller 31a of server 2 displays a screen on whether to display the metadata and the intelli-metadata in the video picture of a summary video file to be generated, on the display of terminal apparatus 1.

Screen 91d as shown in FIG. 21D shows a screen example after the intelli-metafile is stored in HDD 33 of server 2. As shown on screen 91d, check boxes, for selection of causing the metadata or the intelli-metadata to be displayed in the video picture of a summary video file to be generated, are displayed on the display of terminal apparatus 1.

The user, for example, in a case of desiring to display a text of the metadata in the video picture of the summary video file to be generated, selects a check box corresponding to the metadata. In addition, the user for example, in a case of desiring to display a text of the intelli-metadata in the video picture of the summary video file to be generated, selects a check box corresponding to the intelli-metadata. The user can select both or any one of the metadata and the intelli-metadata. Further, the user may not select both of the metadata and the intelli-metadata.

In a case where the metadata is selected, the metadata is displayed in text in the video picture of the summary video file at time when the metadata is added, for example. For example, in a case where Patlite is turned on in a certain time, a text of "Patlite ON" is displayed in a certain time in the video picture of the summary video file In a case where the intelli-metadata is selected, the intelli-metadata is displayed in text in the video picture of the summary video file at time when the intelli-metadata is associated, for example. For example, in a case where a person is not included in the video picture for a constant time in a certain time, a text of "person non-detection" is displayed in a certain time in the video picture of the summary video file.

When "start" button on screen 91d is clicked, controller 21a of terminal apparatus 1 transmits video display information (information on whether to display the text of the metadata and the intelli-metadata in the video picture of the summary video file) selected by the user to server 2.

When controller 31a of server 2 receives the video display information from terminal apparatus 1, controller 31a of server 2 transmits the video file and the intelli-metafile stored in the folder and the video display information received from terminal apparatus 1 to server 62.

Controller 81a of server 62 generates a summary video file based on the information received from server 2. For example, controller 81a of server 62 extracts a predetermined video picture from the video picture of the video file based on the intelli-metadata in the intelli-metafile and the metadata added to the video file to generate the summary video file. When controller 81a of server 62 generates the summary video file, controller 81a of server 62 includes the text of the metadata or the intelli-metadata in the video picture of the summary video file based on the video display information received from server 2.

Controller 81a of server 62 transmits the generated summary video file to server 2. Controller 31a of server 2 stores the summary video file in the folder in which the video file as the source of the summary video file is stored.

Thereby, the user accesses the folder of the case managed by server 2, making it possible to browse the summary video file.

Figure 22:
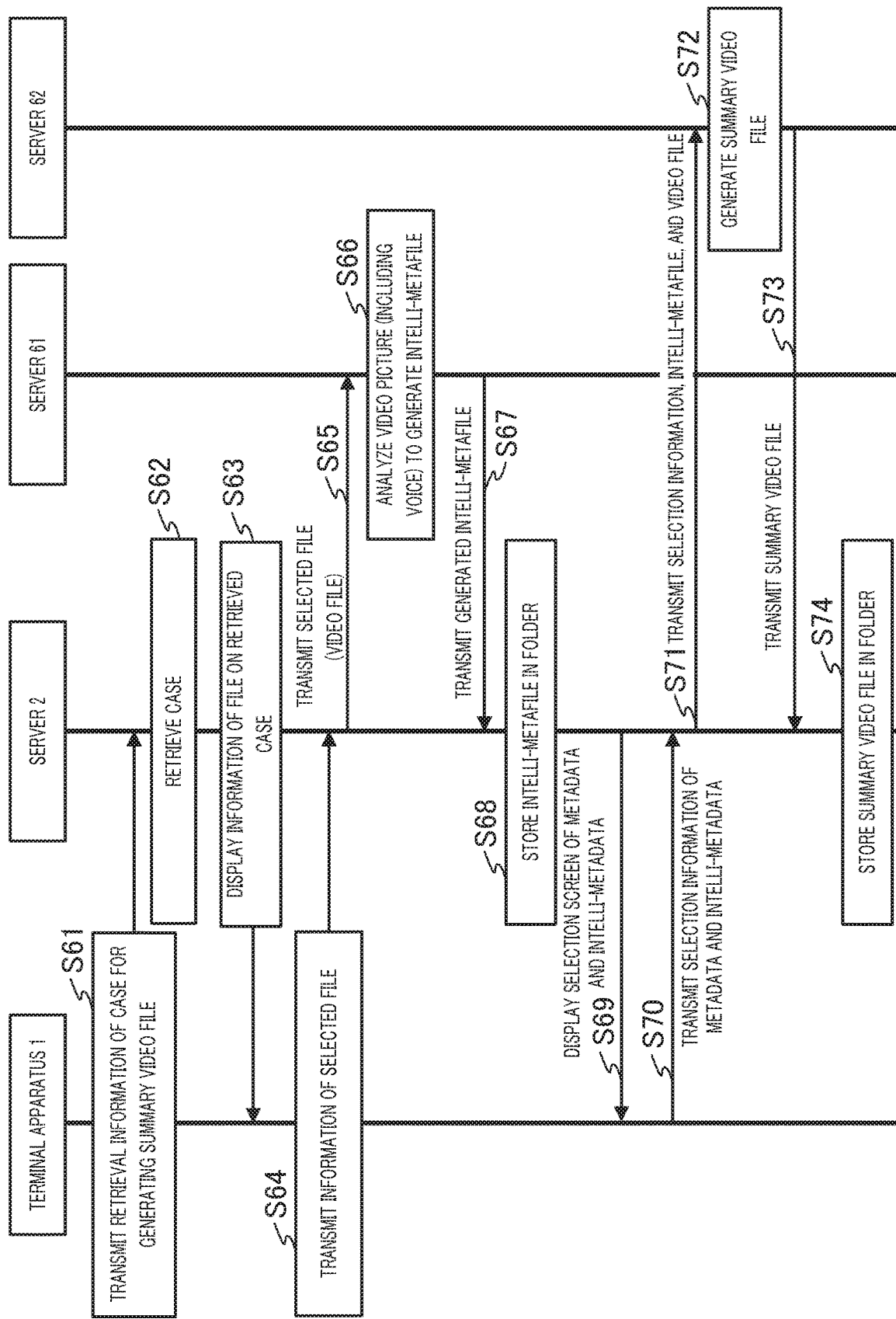
FIG. 22 is a sequence diagram showing a summary video file generation operation example in the summary video generation system.

FIG. 22 is a sequence diagram showing a summary video file generation operation example of the summary video generation system. Controller 21a of terminal apparatus 1 accesses server 2 in response to an operation of a user. Controller 31a of server 2 displays a retrieval screen of a case on the display of terminal apparatus 1 in response to the access from terminal apparatus 1 (for example, refer to screen 91a in FIG. 21A). The user inputs retrieval information of a desired case for producing a summary video file on the retrieval screen of the display of terminal apparatus 1.

Controller 21a of terminal apparatus 1 transmits the retrieval information of the case of generating the summary video file input by the user to server 2 (step S61).

Controller 31a of server 2 refers to HDD 33 to retrieve the case based on the retrieval information received in step S61 (step S62).

Controller 31a of server 2 displays type information (for example, refer to screen 91b in FIG. 21B) of files (for example, a video file, a voice file, an image file of a memorandum, and the like) stored in the folder of the case retrieved in step S62, on the display of terminal apparatus 1 (step S63).

The user selects a file of generating a summary video file on the screen in step S63 (for example, selects a radio button on screen 51b in FIG. 9B).

Controller 21a of terminal apparatus 1 transmits information (for example, information of BWC video selected with the radio button on screen 91c in FIG. 21C) of the file that is selected (designated) by the user and generates the summary video file, to server 2 (step S64).

Controller 31a of server 2 obtains a file (for example, a video file of a video picture shot by a wearable camera) corresponding to the information of the file received in step S64 from HDD 33, and transmits a copy of the obtained file to server 61 (step S65).

Controller 71a of server 61 analyzes the video picture of the video file transmitted in step S65 to generate an intelli-metafile (step S66).

Controller 71a of server 61 transmits the generated intelli-metafile to server 2 (step S67).

Controller 31a of server 2 links the intelli-metafile transmitted in step S67 to the video file (the video file transmitted in step S65) as a generation source of the intelli-metafile to store the intelli-metafile in HDD 33 (step S68). For example, controller 31a of server 2 stores the intelli-metafile in the folder in which the video file as the generation source of the intelli-metafile is stored.

When controller 31a of server 2 stores the intelli-metafile in the folder, controller 31a of server 2 displays a selection screen (for example, screen 91d in FIG. 21D) of the metadata and the intelli-metadata on the display of terminal apparatus 1 (step S69).

For example, in a case of desiring to display the text of metadata in the video picture of the summary video file to be generated, the user selects a check box corresponding to the metadata. In addition, for example, in a case of desiring to display the text of intelli-metadata in the video picture of the summary video file to be generated, the user selects a check box corresponding to the intelli-metadata.

Controller 21a of terminal apparatus 1 transmits the selection information (video display information) of the metadata and the intelli-metadata selected by the user to server 2 (step S70).

Controller 31*a* of server 2 transmits the video display information received in step S70, the intelli-metafile stored in the folder in step S68 and the video file as the generation source of the intelli-metafile to server 62 (step S71).

Controller 81*a* of server 62 generates a summary video file from the video display information, the intelli-metafile, and the video file transmitted in step S71 (step 72).

Controller 81*a* of server 62 transmits the summary video file generated in step S72 to server 2 (step S73).

Controller 31*a* of server 2 links the summary video file transmitted in step S72 with the video file as the source of the summary video file to store the summary video file in HDD 33 (step S74). For example, controller 31*a* of server 2 stores the summary video file in the folder in which the video file as the source of the summary video file is stored.

Consequently the user, for example, accesses the folder of the case managed in server 2, thus making it possible to browse the summary video file.

<Operation 2-1: Operation of Browsing Summary Video File>

FIG. 23A, FIG. 23B, FIG. 23C, and FIG. 23D are diagrams showing screen examples of terminal apparatus 1 in the browsing operation of the summary video file.

Screen 92*a* as shown in FIG. 23A is displayed when terminal apparatus 1 accesses server 2, for example. Controller 31*a* of server 2 displays screen 92*a* on the display of terminal apparatus 1 in response to the access from terminal apparatus 1.

Screen 92*a* is a screen for retrieving a case. A user inputs information of a desired case for browsing a summary video file in text boxes displayed on screen 92*a*, thus making it possible to retrieve the desired case for browsing the summary video file.

In an example of screen 92*a*, the case number [NJ180425000011003] of the desired case for browsing the summary video file is input in the text box of the case number. When the user does not know the case number of the desired case for browsing the summary video file, for example, it is possible to retrieve the desired case for browsing the summary video file by inputting at least one of the date when the case occurs, the case type, the police officer name, and the police station name in the text box.

Screen 92*b* as shown in FIG. 23B shows a screen example after retrieving the case. Screen 92*b* is displayed on the display of terminal apparatus 1 when "retrieval" button in FIG. 23A is clicked, for example.

The case number [NJ180425000011003] of the retrieved case is displayed on screen 92*b*. Further, the type list of the files stored in the folder of the retrieved case is displayed on screen 92*b*.

File information of "summary video" is added to screen 92*b*, which is different from screen 91*b* of the retrieval result as shown in FIG. 21B. That is, since the summary video file is generated in the case of the case number [NJ180425000011003], the file information of "summary video" is added to screen 92*b*.

Radio buttons are displayed on screen 92*b*. A user selects a radio button corresponding to a desired file for browsing or viewing.

For example, in a case where the user is desired to view "summary video" (that is, in a case of desiring to view the summary video file generated in server 62), the user selects a radio button corresponding to "summary video".

Figure 23C:
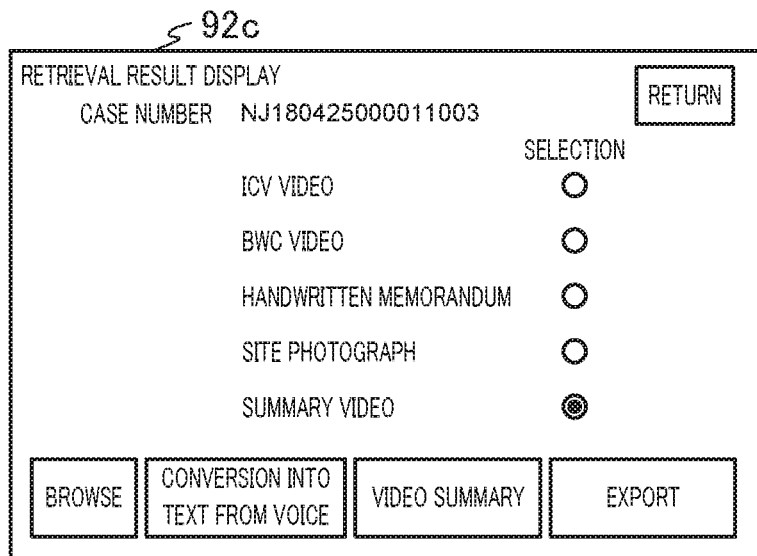
FIG. 23C is a diagram showing a screen example of the terminal apparatus in the browsing operation of the summary video file.

Screen 92*c* as shown in FIG. 23C shows a screen example after a desired file for browsing or viewing is selected. "Summary video" is selected on screen 92*c*.

When "browse" button as shown on screen 92*c* is clicked, controller 21*a* of terminal apparatus 1 transmits information (in an example of screen 92*c*, information of "summary video") of the file selected with the radio button by the user to server 2.

When controller 311*a* of server 2 receives the information of the file selected with the radio button by the user from terminal apparatus 1, controller 31*a* of server 2 displays a video picture of a file corresponding to the received information in terminal apparatus 1. Since in the example of screen 92*c*, "summary video" is selected, controller 31*a* of server 2 extracts the summary video file stored in the folder of the retrieved case and displays a video picture of the summary video file on the display of terminal apparatus 1.

Figure 23D:
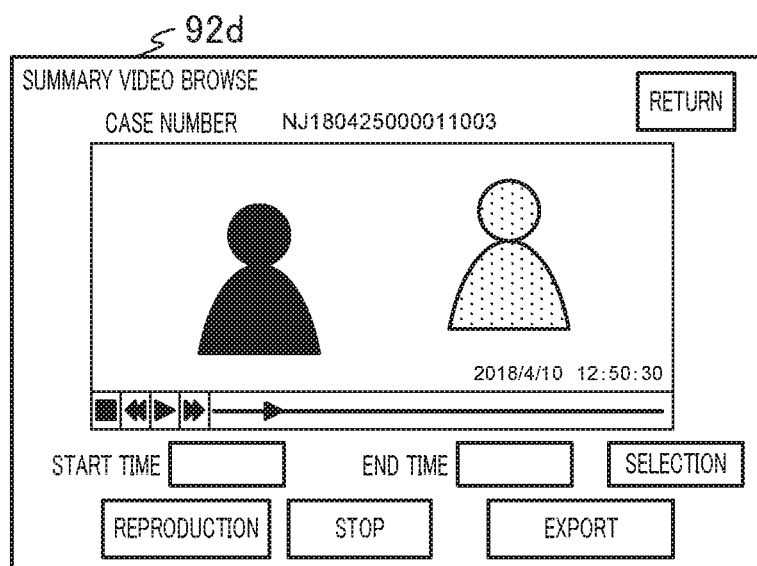
FIG. 23D is a diagram showing a screen example of the terminal apparatus in the browsing operation of the summary video file.

Screen 92*d* as shown in FIG. 23D shows a screen example on which the video picture of the summary video file is displayed. The user performs operations of reproduction, temporal stop, stop, fast-forward, quick return, and the like of a video on the display of terminal apparatus 1, making it possible to view the summary video file.

Figure 24:
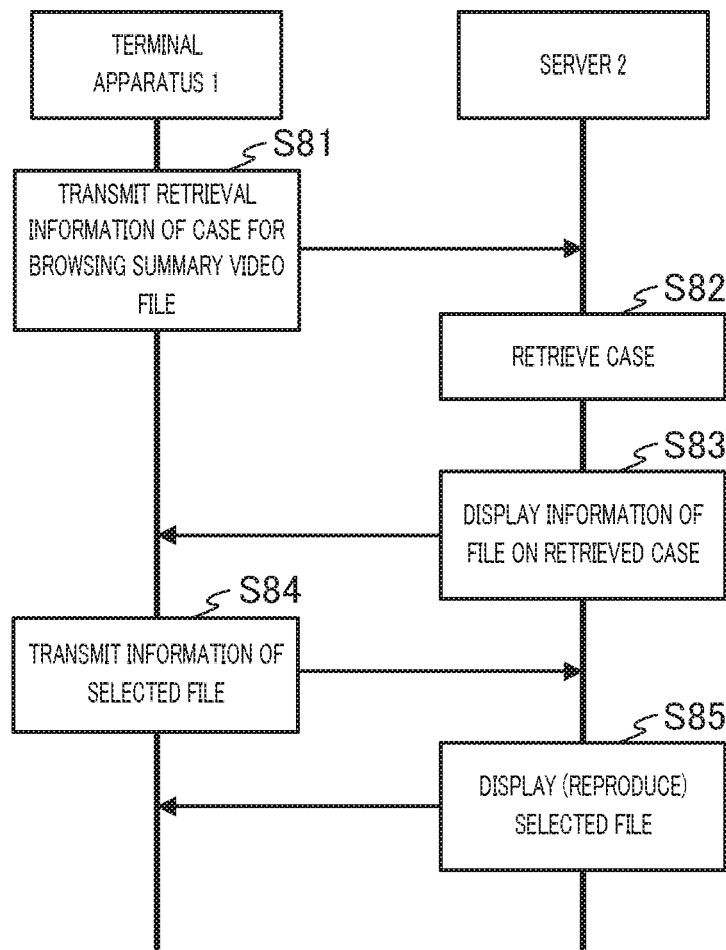
FIG. 24 is a sequence diagram showing a summary video file reproduction operation example in the summary video generation system.

FIG. 24 is a sequence diagram showing a summary video file reproduction operation example of the summary video generation system. A user inputs retrieval information for retrieving a desired case for viewing a summary video file by using terminal apparatus 1.

Controller 21*a* of terminal apparatus 1 transmits the retrieval information input by the user to server 2 (step S81).

Controller 31*a* of server 2 refers to HDD 33 to retrieve a case based on the retrieval information received in step S81 (step S82).

Controller 31*a* of server 2 displays type information (for example, refer to screen 92*b* in FIG. 23B) of files (for example, a video file, a voice file, an image file of a memorandum, summary video file, and the like) stored in the folder of the case retrieved in step S82, on the display of terminal apparatus 1 (step S83).

The user selects the summary video file on the screen in step S83 (for example, selects a radio button corresponding to "summary video" on screen 92*c* in FIG. 23C).

Controller 21*a* of terminal apparatus 1 transmits the information (information of having selected the summary video file) selected by the user to server 2 (step S84).

Controller 31*a* of server 2 displays a video picture (for example, refer to screen 92*d* in FIG. 23D) of the file (summary video file) of the information that is selected by the user and is transmitted in step S84, on the display of terminal apparatus 1 (step S85).

Buttons of reproduction, temporal stop, stop, fast-forward, quick return, and the like are displayed on the display of terminal apparatus 1 (for example, refer to screen 92*d* in FIG. 23D). The user clicks these buttons, thus making it possible to perform operations of reproduction, temporal stop, stop, fast-forward, quick return, and the like of the video.

<Operation 2-2: Export Operation>

Figure 25:
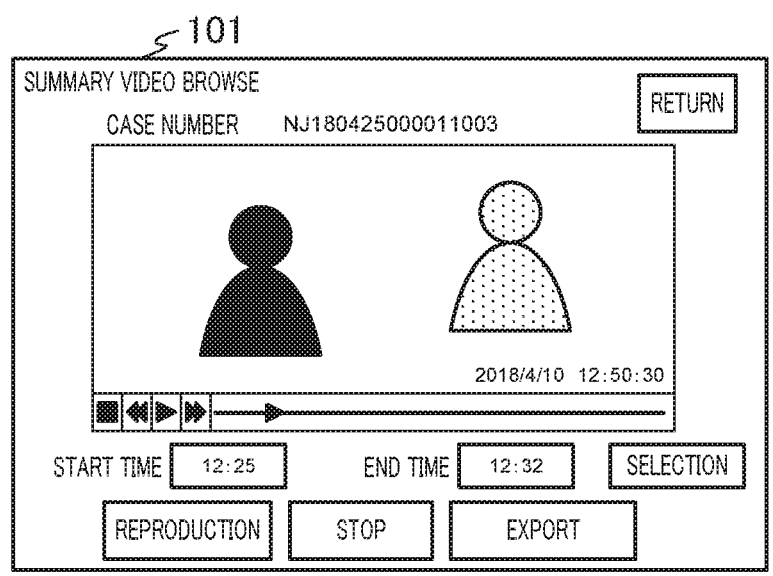
FIG. 25 is a diagram showing a screen example of the terminal apparatus in the export operation.

FIG. 25 is a diagram showing a screen example of terminal apparatus 1 in the export operation.

Screen 101 as shown in FIG. 25 shows a screen example after a desired file for browsing or viewing is selected. Screen 101 corresponds to screen 92*d* explained in FIG. 23D, for example. For example, screen 101 shows a screen example in which after the case is retrieved by server 2, the information of files in the folder of the retrieved case is displayed on the display of terminal apparatus 1, and a desired summary video file for viewing is selected by the user. The video picture in the summary video file is displayed on screen 101.

The user clicks buttons of reproduction, temporal stop, stop, fast-forward, quick return, and the like displayed on the display of terminal apparatus 1 to browse the summary video file. The user, as a result of having viewed the summary video, designates a desired range of export from the video picture in the summary video file on the display of terminal apparatus 1.

For example, the user designates a start time of a desired summary video for export on the display of terminal apparatus 1. In addition, the user designates an end time of a desired summary video for export on the display of terminal apparatus 1.

In an example of screen 101, "12:25" is input in the text box of "start time" for starting the export. In the example of screen 101, "12:32" is input in the text box of "end time" for ending the export.

The user may click "selection" button on screen 101 when a desired video picture for starting the export is displayed in the middle of browsing the video. Controller 21a of terminal apparatus 1 may input a time within the reproducing video in the text box of "start time" in response to clicking "selection" button. Controller 21a of terminal apparatus 1 may input a time within the reproducing video in the text box of "end time" in response to next clicking "selection" button.

When an export range of the summary video file is designated and "export" button is clicked, controller 21a of terminal apparatus 1 transmits information of the export range input on screen 101 to server 2.

Controller 31a of server 2 edits a copy file of the summary video file based on the information of the export range transmitted from terminal apparatus 1. For example, controller 31a of server 2 deletes a video picture out of the export range of the copy file to generate an export file. Consequently the user can obtain a video file of the video picture in the designated range by the user from the summary video file.

Figure 26:
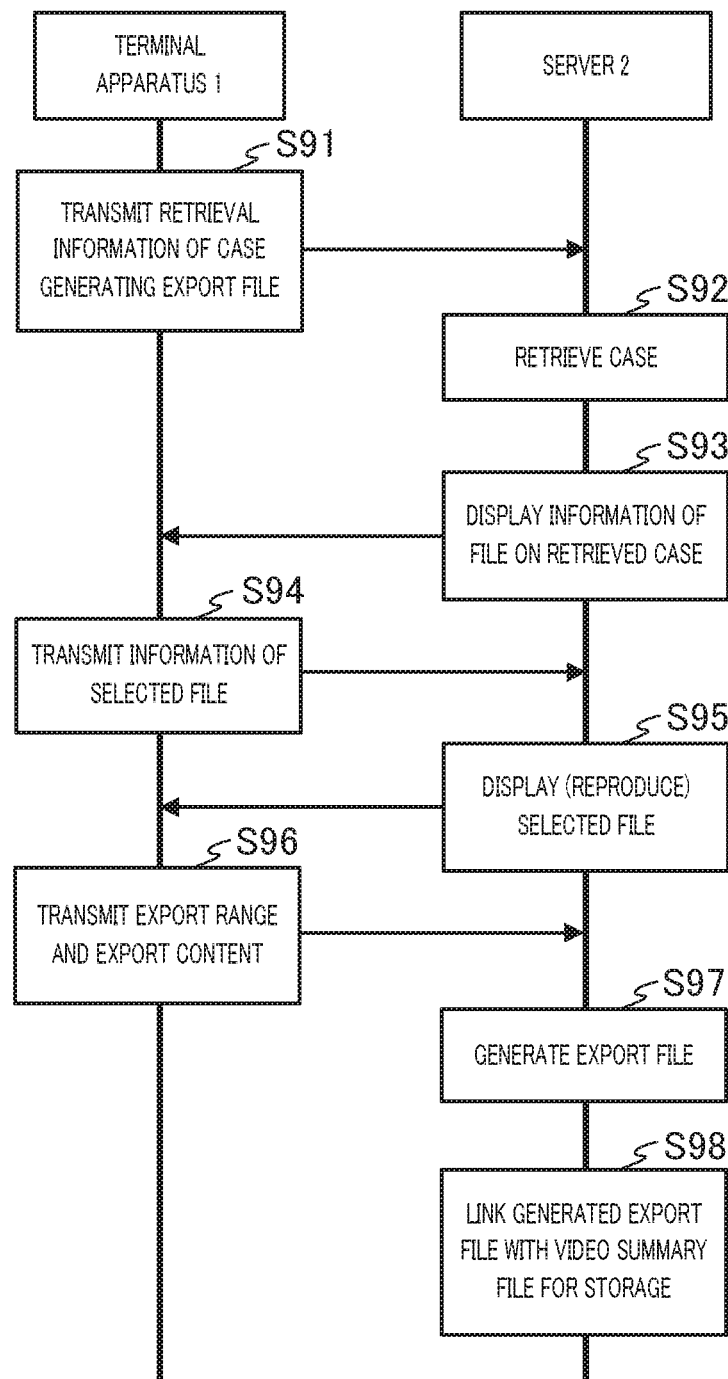
FIG. 26 is a sequence diagram showing an export operation example in the document production system.

FIG. 26 is a sequence diagram showing an export operation example of the document production system. The user uses terminal apparatus 1 to input retrieval information for retrieving a desired case for producing an export file.

Controller 21a of terminal apparatus 1 transmits the retrieval information input by the user to server 2 (step S91).

Controller 31a of server 2 refers to HDD 33 to retrieve a case based on the retrieval information received in step S91 (step S92).

Controller 31a of server 2 displays type information (for example, refer to screen 92b in FIG. 23B) of files (for example, a video file, a voice file, an image file of a memorandum, a summary video file, and the like) stored in the folder of the case retrieved in step S92, on the display of terminal apparatus 1 (step S93).

The user selects a summary video file on a screen displayed on the display of terminal apparatus 1 in step S93 (for example, selects a radio button corresponding to "summary video" on screen 92c in FIG. 23C).

Controller 21a of terminal apparatus 1 transmits the information (information of having selected the summary video file) selected by the user to server 2 (step S94).

Controller 31a of server 2 displays the video picture (for example, refer to screen 101 in FIG. 25) of the file (summary video file) of the information that is selected by the user and is transmitted in step S94, on the display of terminal apparatus 1 (step S95).

The user views the video displayed on the display of terminal apparatus 1, making it possible to designate a desired range for producing the export file. For example, the user can designate a desired range for producing the export file by time within the video picture (for example, refer to a start time and an end time on screen 101 in FIG. 25). The user performs operations of reproduction, quick return, and the like of the video to repeatedly view the video, making it possible to designate a desired range for producing the export file.

Controller 21a of terminal apparatus 1 transmits the export range designated by the user to server 2 (step S96).

Controller 31a of server 2 edits a video picture in the copy file of the summary video file (for example, deletes a video picture out of the export range) based on the export range transmitted in step S96 to generate an export file (step S97).

Controller 31a of server 2 links the export file generated in step S97 to the summary video file to store the export file in HDD 33 (step S98). For example, controller 31a of server 2 stores the export file in the folder in which the summary video file as the source of the export file is stored. Consequently the user can obtain the video file of the video picture in a range designated by the user from the summary video file.

<Operation 2-3: Operation of Generating AT File from Summary Video File>

Figure 27:
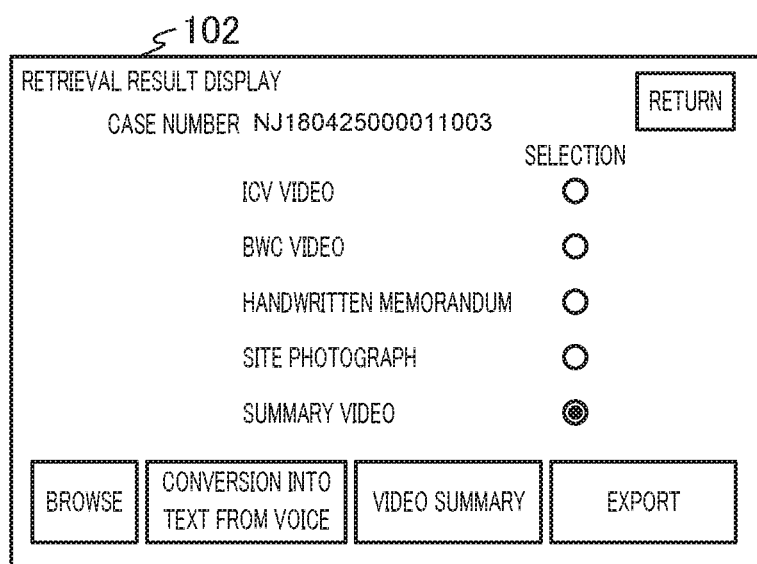
FIG. 27 is a diagram showing a screen example of the terminal apparatus in a generation operation of the AT file.

FIG. 27 is a diagram showing a screen example of terminal apparatus 1 in the generation operation of the AT file.

Screen 102 as shown in FIG. 27 shows a screen example after selecting a desired file for generating an AT file. Screen 102 corresponds to screen 92c explained in FIG. 23C, for example. "Summary video" is selected on screen 102.

In a case of desiring to generate an AT file of the video picture in the summary video file, the user clicks "conversion into text from voice" button on screen 101.

When "conversion into text from voice" button as shown on screen 102 is clicked, controller 21a of terminal apparatus 1 transmits information (in an example of screen 102, information of "summary video") of the file selected with the radio button by the user to server 2.

When controller 311a of server 2 receives the information of the file selected with the radio button by the user from terminal apparatus 1, controller 31a of server 2 transmits a copy of the file corresponding to the received information to server 3 explained in Embodiment 1. Since in the example of screen 101, "summary video" is selected, controller 31a of server 2 transmits a copy of the summary video file to server 3.

When controller 41a of server 3 receives the summary video file transmitted from server 2, controller 41a of server 3 extracts voice data and converts the extracted voice data into text data. Controller 41a of server 3 generates, for example, an AT file as shown in FIG. 4. When controller 41a of server 3 generates the AT file, controller 41a of server 3 transmits the generated AT file to server 2.

When controller 31a of server 2 receives the AT file from server 3, controller 31a of server 2 stores the AT file in the folder in which the summary video file transmitted to server 3 is stored. Consequently the summary video file and the AT file in the summary video file are linked (stored in the folder of the same case) to be managed.

Thereby a user accesses the folder of the case managed by server 2, making it possible to browse the AT file in the summary video file.

Figure 28:
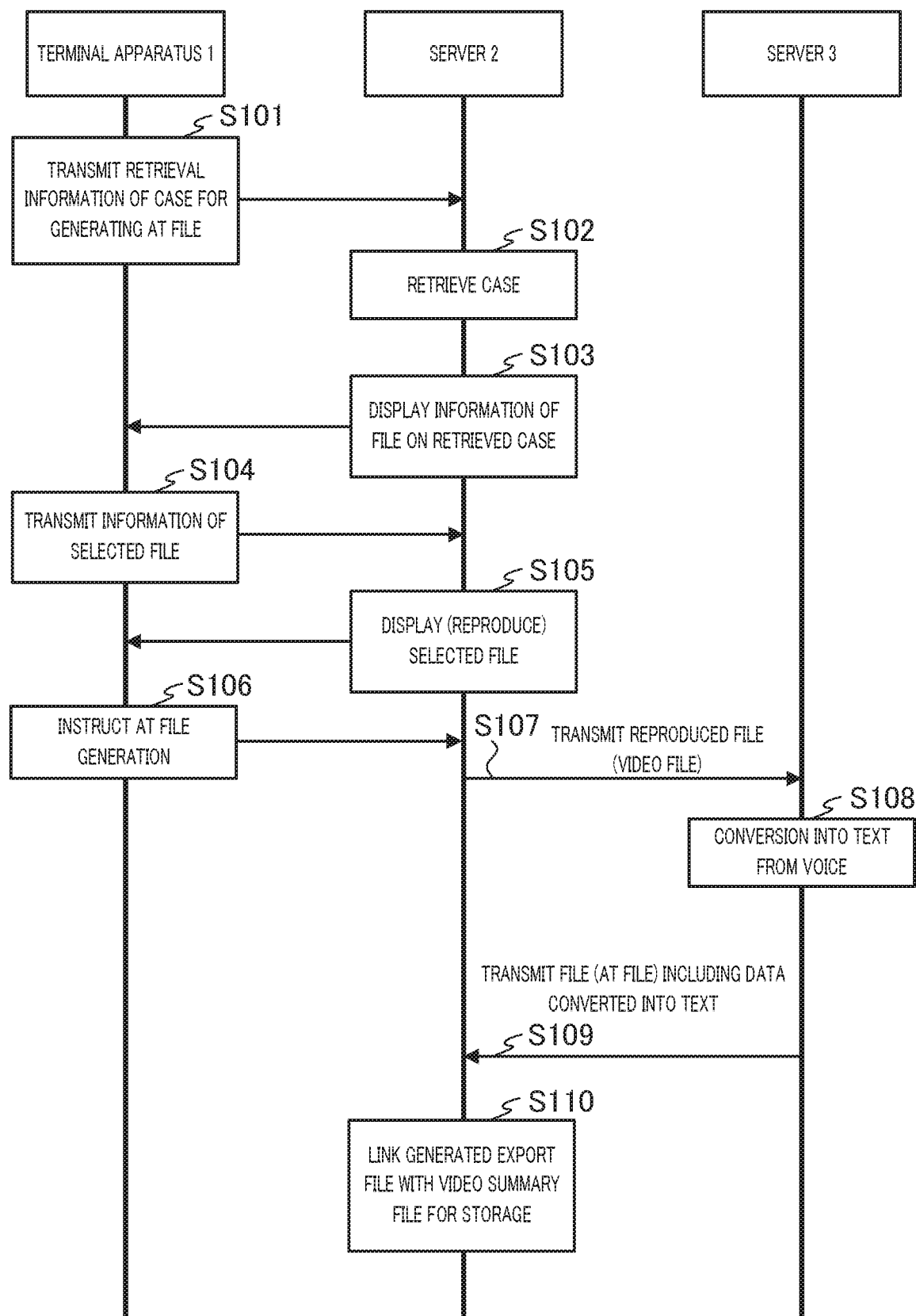
FIG. 28 is a sequence diagram showing an AT file generation operation example in the summary video generation system.

FIG. 28 is a sequence diagram showing an AT file generation operation example of the summary video generation system. The user uses terminal apparatus 1 to input retrieval information for retrieving a desired case for producing an AT file.

Controller 21a of terminal apparatus 1 transmits the retrieval information input by the user to server 2 (step S101).

Controller 31a of server 2 refers to HDD 33 to retrieve a case based on the retrieval information transmitted in step S101 (step S102).

Controller 31a of server 2 displays type information (for example, refer to screen 92b in FIG. 23B) of files (for example, a video file, a voice file, an image file of a memorandum, a summary video file, and the like) stored in the folder of the case retrieved in step S102, on the display of terminal apparatus 1 (step S103).

The user selects the summary video file on a screen in step S103 (for example, selects a radio button corresponding to "summary video" on screen 102 in FIG. 27).

Controller 21a of terminal apparatus 1 transmits the information (information of having selected the summary video file) selected by the user to server 2 (step S104).

Controller 31a of server 2 displays the video picture of the file (summary video file) of the information that is selected by the user and is transmitted in step S104, on the display of terminal apparatus 1 (step S105).

The user views the video displayed on the display of terminal apparatus 1, making it possible to designate a desired range for producing the AT file. For example, the user can designate a desired range for producing the AT file by a time within the video picture. The user performs operations of reproduction, quick return, and the like of the video to repeatedly view the video, making it possible to designate a desired range for producing the export file.

Controller 31a of server 2 transmits the range of the AT file designated by the user and a generation instruction of the AT file to server 2 (step S106).

When controller 31a of server 2 receives the generation instruction of the AT file transmitted in step S106, controller 31a of server 2 copies the summary video file reproduced in step S105 to transmit a copy of the summary video file to server 3 (step S107). Controller 31a of server 2 transmits the range of the AT file transmitted in step S106 to server 3.

Controller 41a of server 3 converts, to text, voices included in the summary video file transmitted in step S107 in the range of the AT file transmitted in step S107 (step S108).

Controller 41a of server 3 transmits the AT file including the data converted into text to server 2 (step S109).

Controller 31a of server 2 links the AT file transmitted in step S109 to the video file converted into text (the summary video file transmitted in step S107) to store the AT file in HDD 33 (step S110). For example, controller 31a of server 2 stores the AT file in the folder in which the summary video file converted into text is stored.

Consequently the user accesses, for example, the folder of the case managed by server 2, making it possible to browse the AT file.

As explained above, controller 31a of server 2 configuring the information processing apparatus obtains the video file designated by terminal apparatus 1 from HDD 33 in which the video file of the video picture shot by the wearable camera attached to or owned by the police officer or by the on-vehicle camera mounted on the police vehicle is stored. Controller 71a of server 61 configuring the information processing apparatus analyzes the video picture in the video file obtained by server 2 to generate the intelli-metadata associated with the case. Controller 81a of server 62 configuring the information processing apparatus generates the summary video file by extracting a video picture portion as the report target of the case from the video file based on the intelli-metadata generated by server 61. Communication interface 34 of server 2 configuring the information processing apparatus transmits the data of the summary video file generated by server 62 to terminal apparatus 1. In this way, since the information processing apparatus generates the summary video file including the video picture of the portion as the report target from the video file of the video picture shot by the camera, the production of the report associated with the case by the user is made easy.

In the above description, the intelli-metadata is managed by the file different from the video file, but is not limited thereto. The intelli-metadata may be added to the video data in the video file.

Each of the functional blocks used for explanation of the above embodiments is realized as an LSI as an integrated circuit typically. These may be individually one-chipped and may be one-chipped to include a part or all of them. Here, each of the functional blocks is formed of the LSI, but may be called an IC, a system LSI, a super LSI, and an ultra LSI depending on a difference of an integration degree.

The method for forming an integrated circuit is not limited to the LSI, but may be realized by an exclusive circuit or a general-purpose processor. After the LSI manufacturing, a programmable field programmable gate array (FPGA) or a reconfigurable processor capable of reconstructing connection or setting of circuit cells in the inside of the LSI may be used.

Further, if techniques of forming an integrated circuit that will replace the LSI by progress of semiconductor techniques or different techniques to be incurred therefrom appear, the integration of functional blocks may be executed using the techniques, not to mention. Application of biotechniques or the like may be made possible.

Controller 31a of server 2 as explained above may function as an obtainer that obtains the video file designated by terminal apparatus 1 from HDD 33 having stored the video file of the video picture associated with the case shot by the camera. In addition, controller 41a of server 3 may function as a converter that extracts voice data included in the video file and converts the extracted voice data into the text data. Further, communication interface 34 of server 2 may function as a transmitter that transmits the text data (AT file) to terminal apparatus 1. Further, controller 41a of server 3 may function as a generator that generates the AT file in the file format designated by terminal apparatus 1.

Controller 31a of server 2 may function as an obtainer that obtains the video file designated by terminal apparatus 1 from HDD 33 having stored the video file of the video picture associated with the case shot by the camera. In addition, controller 71a of server 61 may function as a generator that analyzes the video picture in the video file to generate the intelli-metadata. Controller 81a of server 62 may function as a generator that generates the summary video file by deleting a part of the video picture in the video file based on the intelli-metadata generated by server 61. Further, communication interface 34 of server 2 may function as a transmitter that transmits the video picture data in the summary video file generated by server 62 to terminal apparatus 1.

INDUSTRIAL APPLICABILITY

The present disclosure is useful for document production systems and summary video generation systems on cases at police stations.

REFERENCE SIGNS LIST

1 Terminal apparatus
2, 3, 61, 62 Server

10 AT file
11a, 11b Time stamp
12a, 12b Identifier
13a, 13b Text
14a, 14b Metadata
15a, 15b Image
21, 31, 41, 71, 81 CPU
21a, 31a, 41a, 71a, 81a Controller
22, 32, 42, 72, 82 RAM
23, 33, 43, 73, 83 HDD
24, 34, 44, 74, 84 Communication interface
25 User interface

The invention claimed is:

1. An information processing apparatus, comprising:
an obtainer that obtains, from a storage apparatus, video picture data including a video picture shot by a wearable camera attached to or owned by a police officer or shot by an on-vehicle camera mounted on a police vehicle, the video picture being designated by a terminal apparatus;
an information generator that generates information associated with a case by analyzing the video picture included in the video picture data, the information including detection timings and non-detection timings of a plurality of events, the detection timings being timings of the plurality of events being detected in the video picture, the non-detection timings being timings of the plurality of events being undetected for a period of time in the video picture;
a summary video picture data generator that generates, as a report target of the case, summary video picture data including a video picture portion extracted from the video picture based on the information, the video picture portion being a portion of the video picture that starts from a first detection timing of the detection timings and ends at a first non-detection timing of the non-detection timings; and
a transmitter that transmits the summary video picture data to the terminal apparatus.

2. The information processing apparatus according to claim 1, wherein
the summary video picture data generator includes the information in the summary video picture data as text data, and
the information is displayed in text on a display of the terminal apparatus.

3. The information processing apparatus according to claim 1, wherein the summary video picture data generator generates extraction summary video picture data that is part of the summary video picture data extracted in a video picture range designated by the terminal apparatus.

4. The information processing apparatus according to claim 1, wherein the plurality of events includes a presence of at least one of a person, a vehicle, an abnormal behavior of a person, a crowd of people, a conversation, a gunshot, or an explosion sound in the video picture.

5. The information processing apparatus according to claim 1, further comprising:
a converter that extracts voice data included in the summary video picture data and converts the extracted voice data into text data, wherein
the transmitter transmits the text data resulting from the conversion to the terminal apparatus.

6. The information processing apparatus according to claim 1, wherein the obtainer, the information generator, the summary video picture data generator, and the transmitter are included in a single server.

7. The information processing apparatus according to claim 1, wherein the information generator is included in a first server, and the summary video picture data generator is included in a second server different from the first server.

8. The information processing apparatus according to claim 1, wherein the plurality of events includes a presence of a person, a vehicle, an abnormal behavior of a person, a crowd of people, and a conversation.

9. The information processing apparatus according to claim 1, wherein
the first detection timing is a timing of a first event of the plurality of events being detected in the video picture,
the first non-detection timing is a timing of a second event of the plurality of events, which is different from the first event, being undetected for the period of time in the video picture.

10. The information processing apparatus according to claim 9, wherein
the first event is an event selected from a presence of a person, a vehicle, an abnormal behavior of a person, a crowd of people, and a conversation, and
the second event is an event different from the first event selected from the presence of the person, the vehicle, the abnormal behavior of the person, the crowd of people, and the conversation.

11. The information processing apparatus according to claim 1, wherein
the summary video picture data includes another video picture portion extracted from the video picture based on the information,
the another video picture portion is another portion of the video picture that starts from a second detection timing of the detection timings and ends at a second non-detection timing of the non-detection timings.

12. The information processing apparatus according to claim 1, wherein the summary video picture data generator removes a portion of the video picture that starts from the first non-detection timing and ends at a second detection timing of the detection timings.

13. A method comprising:
obtaining, from a storage apparatus, video picture data including a video picture shot by a wearable camera attached to or owned by a police officer or shot by an on-vehicle camera mounted on a police vehicle, the video picture being designated by a terminal apparatus;
generating information associated with a case by analyzing the video picture included in the video picture data, the information including detection timings and non-detection timings of a plurality of events, the detection timings being timings of the plurality of events being detected in the video picture, the non-detection timings being timings of the plurality of events being undetected for a period of time in the video picture;
generating, as a report target of the case, summary video picture data including a video picture portion extracted from the video picture based on the information, the video picture portion being a portion of the video picture that starts from a first detection timing of the detection timings and ends at first non-detection timing of the non-detection timings; and
transmitting the summary video picture data to the terminal apparatus.

* * * * *